United States Patent
Joshi et al.

(10) Patent No.: US 11,461,933 B2
(45) Date of Patent: Oct. 4, 2022

(54) DECISION-MAKING RULES FOR ATTRIBUTE SMOOTHING

(71) Applicant: Samsung Electronics Co., Ltd., Suwon-si (KR)

(72) Inventors: Rajan Laxman Joshi, San Diego, CA (US); Hossein Najaf-Zadeh, Allen, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 17/033,508

(22) Filed: Sep. 25, 2020

(65) Prior Publication Data

US 2021/0104074 A1    Apr. 8, 2021

Related U.S. Application Data

(60) Provisional application No. 62/909,604, filed on Oct. 2, 2019, provisional application No. 62/927,811, filed
(Continued)

(51) Int. Cl.
*G06T 9/00* (2006.01)
*G06T 3/40* (2006.01)
(Continued)

(52) U.S. Cl.
CPC .................. *G06T 9/00* (2013.01); *G06T 3/40* (2013.01); *G06T 5/002* (2013.01); *G06T 5/50* (2013.01);
(Continued)

(58) Field of Classification Search
CPC .. G06T 3/40; G06T 5/002; G06T 5/50; G06T 9/00; G06T 9/001; G06T 2207/10024; G06T 2207/10028; H04N 19/597
See application file for complete search history.

(56) References Cited

U.S. PATENT DOCUMENTS

2005/0114059 A1\* 5/2005 Chang .................. G06Q 10/04
702/84
2016/0086353 A1    3/2016 Lukac et al.
(Continued)

FOREIGN PATENT DOCUMENTS

KR    10-2019-0089115 A    7/2019

OTHER PUBLICATIONS

Sebastian Schwarz et al. "Emerging MPEG Standards for Point Cloud Compression"IEEE Journal on Emerging and Selected Topics in Circuits and Systems, vol. 9, No. 1, Mar. 2019 (Year: 2019).\*
(Continued)

*Primary Examiner* — Mekonen T Bekele

(57) ABSTRACT

A method for point cloud decoding includes receiving a bitstream. The method also includes decoding the bitstream into multiple frames that include pixels. A portion of the pixels are organized into patches and correspond to respective clusters of points of a 3D point cloud. The method further includes decoding, from the bitstream, an occupancy map frame. The occupancy map frame indicates the portion of the pixels included in the multiple frames that represent the points of the 3D point cloud. In addition, the method includes reconstructing the 3D point cloud using the multiple frames and the occupancy map frame. The method also includes determining whether to perform smoothing to the 3D point cloud based at least in part on properties of the multiple frames. Based on determining to perform the smoothing, the method includes performing the smoothing to the 3D point cloud.

16 Claims, 15 Drawing Sheets

Related U.S. Application Data on Oct. 30, 2019, provisional application No. 62/930,474, filed on Nov. 4, 2019, provisional application No. 62/986,393, filed on Mar. 6, 2020.

(51) Int. Cl.
*G06T 5/50* (2006.01)
*G06T 5/00* (2006.01)

(52) U.S. Cl.
CPC ............... *G06T 2207/10024* (2013.01); *G06T 2207/10028* (2013.01)

(56) References Cited

U.S. PATENT DOCUMENTS

| | | | |
|---|---|---|---|
| 2019/0043250 A1 | 2/2019 | Askan | |
| 2019/0081638 A1* | 3/2019 | Mammou | ............ H03M 7/6064 |
| 2019/0087979 A1* | 3/2019 | Mammou | ................ G06T 9/001 |
| 2019/0139266 A1* | 5/2019 | Budagavi | ................ G06T 17/00 |
| 2019/0156518 A1* | 5/2019 | Mammou | ............. G06T 7/0002 |
| 2019/0311501 A1* | 10/2019 | Mammou | ................ G06T 17/00 |
| 2020/0219285 A1* | 7/2020 | Faramarzi | ............. H04L 65/602 |
| 2020/0302650 A1* | 9/2020 | Aksu | ......................... G06T 9/00 |
| 2021/0084289 A1* | 3/2021 | Sugio | ................... H04N 19/597 |

OTHER PUBLICATIONS

International Search Report of the International Searching Authority dated Jan. 12, 2021 in connection with International Application No. PCT/KR2020/013420, 3 pages.

Schwarz, et al., "Emerging MPEG Standards for Point Cloud Compression," IEEE Journal on Emerging and Selected Topics in Circuits and Systems, vol. 9, No. 1, Mar. 2019, 16 pages.

M. Preda, "3D GC report from the 129 MPEG meeting @ Brussels", International Organisation for Standardisation Organisation Internationale De Normalisation, ISO/IEC JTC1/SC29/WG11, Brussels, BE, Jan. 2020, 45 pages.

H. Najaf-Zadeh, et al., "Low complexity color smoothing", 3DG Draft, International Organisation for Standardisation Organisation Internationale De Normalisation, ISO/IEC JTC1/SC29/WG11, Coding of Moving Pictures and Audio, ISO/IEC JTC1/SC29/WG11 m46277, Marrakech, Morocco, Jan. 2019, 5 pages.

* cited by examiner

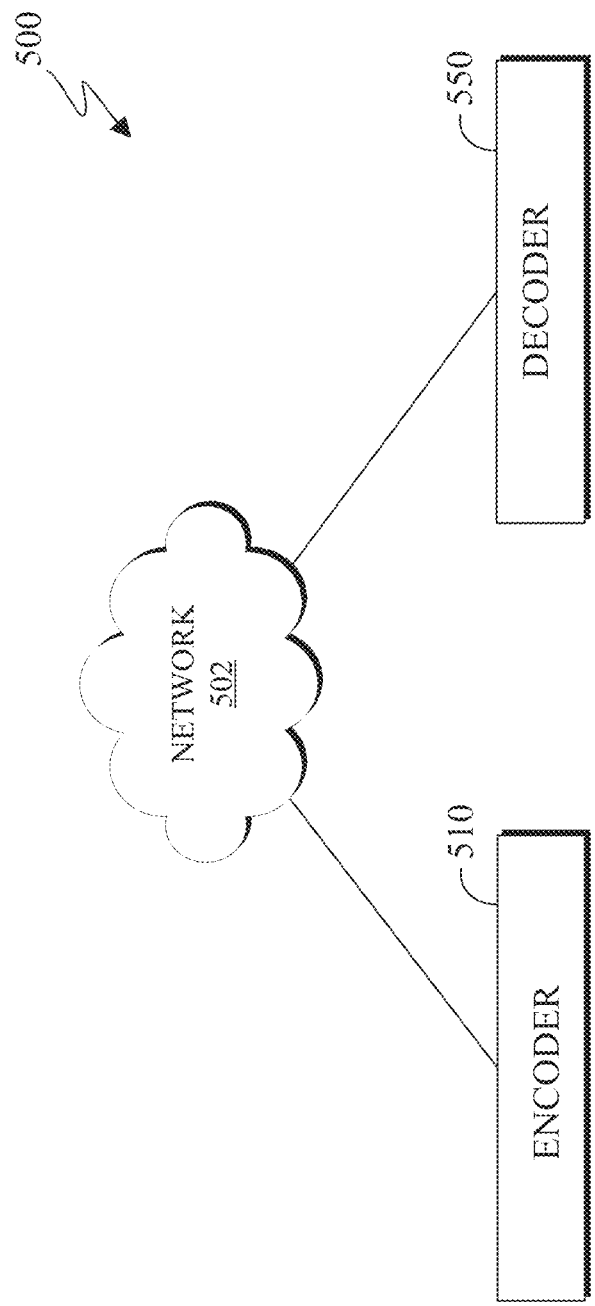

DECISION-MAKING RULES FOR ATTRIBUTE SMOOTHING

CROSS-REFERENCE TO RELATED APPLICATION AND CLAIM OF PRIORITY

This application claims priority under 35 U.S.C. § 119(e) to:

(i) U.S. Provisional Patent Application No. 62/909,604 filed on Oct. 2, 2019, (ii) U.S. Provisional Patent Application No. 62/927,811 filed on Oct. 30, 2019, (iii) U.S. Provisional Patent Application No. 62/930,474 filed on Nov. 4, 2019, and (iv) U.S. Provisional Patent Application No. 62/986,393 filed on Mar. 6, 2020.

The above-identified provisional patent applications are hereby incorporated by reference in its entirety.

TECHNICAL FIELD

This disclosure relates generally to multimedia data. More specifically, this disclosure relates to an apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds, can be used in the immersive environment.

Point clouds are a set of points in 3D space that represent an object. Point clouds can be used in a variety of applications such as gaming, 3D maps, visualizations, medical applications, augmented reality, virtual reality, autonomous driving, multi-view replay, 6 degrees of freedom (6DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud often requires specialized hardware. To avoid specialized hardware to compress a 3D point cloud, a 3D point cloud can be manipulated onto traditional two-dimensional (2D) frames that can be compressed and reconstructed on a different device in order to be viewed by a user. Compressing and decompressing the 2D frames can create artifacts that reduce the visual quality of the point cloud.

SUMMARY

This disclosure provides a modified decision-making rule for attribute smoothing.

In one embodiment, a decoding device for point cloud decoding is provided. The decoding device includes a communication interface and a processor. The communication interface is configured to receive a bitstream. The processor is configured to decode the bitstream into multiple frames that include pixels. A portion of the pixels are organized into patches and correspond to respective clusters of points of a 3D point cloud. The processor is also configured to decode, from the bitstream, an occupancy map frame. The occupancy map frame indicates the portion of the pixels included in the multiple frames that represent the points of the 3D point cloud. The processor is further configured to reconstruct the 3D point cloud using the multiple frames and the occupancy map frame. In addition, the processor is configured to determine whether to perform smoothing to the 3D point cloud based at least in part on properties of the multiple frames. Based on a determination to perform the smoothing, the processor is configured to perform the smoothing to the 3D point cloud.

In another embodiment, a method for point cloud decoding is provided. The method includes receiving a bitstream. The method also includes decoding the bitstream into multiple frames that include pixels. A portion of the pixels are organized into patches and correspond to respective clusters of points of a 3D point cloud. The method further includes decoding, from the bitstream, an occupancy map frame. The occupancy map frame indicates the portion of the pixels included in the multiple frames that represent the points of the 3D point cloud. In addition, the method includes reconstructing the 3D point cloud using the multiple frames and the occupancy map frame. The method also includes determining whether to perform smoothing to the 3D point cloud based at least in part on properties of the multiple frames. Based on determining to perform the smoothing, the method includes performing the smoothing to the 3D point cloud.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5A illustrates a block diagram of an example environment-architecture in accordance with an embodiment of this disclosure;

DETAILED DESCRIPTION

Figure 1:
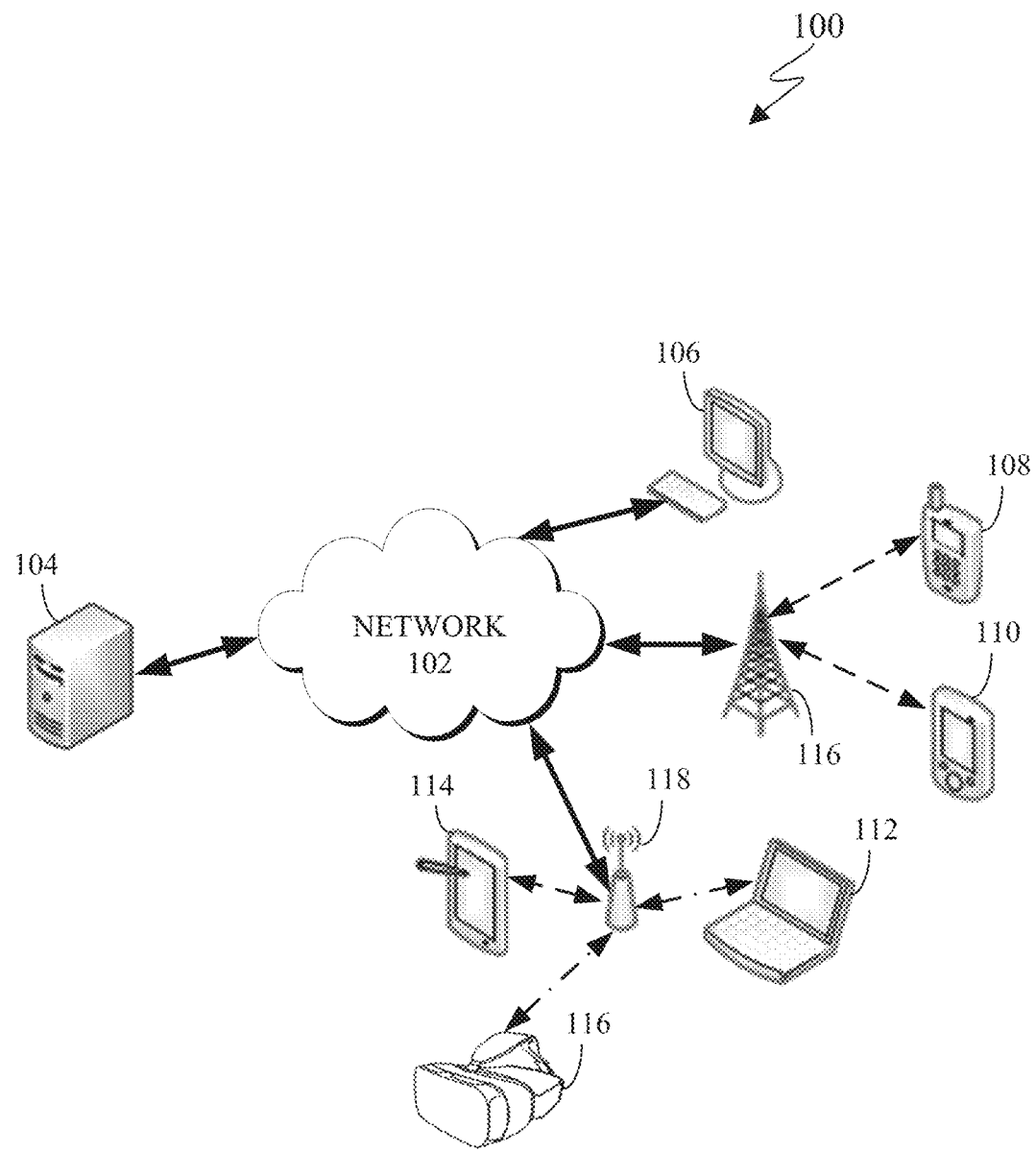
FIG. 1 illustrates an example communication system in accordance with an embodiment of this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual scene, where the entire scene is computer generated. Augmented reality (AR) is an interactive experience of a real-world environment where objects that reside in the real-world environment are augmented with virtual objects, virtual information, or both. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD represents one of many types of devices that provide AR and VR experiences to a user. An HMD is a device that enables a user to view the VR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned in a particular geometric location within 3D space and includes one or more attributes such as color. A point cloud can be similar to a virtual object in a VR or AR environment. A mesh is another type of a virtual representation of an object in a VR or AR environment. A point cloud or a mesh can be an object, multiple objects, a virtual scene (which includes multiple objects), and the like. Point clouds and meshes are commonly used in a variety of applications, including gaming, 3D mapping, visualization, medicine, AR, VR, autonomous driving, multi-view replay, 6 DoF immersive media, to name a few. As used herein, the terms point clouds and meshes can be used interchangeably.

Point clouds represent volumetric visual data. Point clouds consist of multiple points positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In other embodiments, the points are positioned throughout both the internal structure and external surface of the object.

In addition to the geometric position of a point (the location of the point in 3D space), each point in the point cloud can also include one or more attributes such as color, texture, reflectance, intensity, surface normal, and the like. In some embodiments, a single point of a 3D point cloud can have multiple attributes. In some applications, point clouds can also be used to approximate light field data in which, each point includes multiple view-dependent, color information (R, G, B or Y, U, V triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point cloud is necessary to reduce the volume of data (bandwidth) that is used when a point cloud is transmitted from one device (such as a source device) to another device (such as a display device). Certain dedicated hardware components can be used to meet the real-time demands or reduce delays or lags in the transmitting and rendering a 3D point cloud; however, such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D representation to a 2D representation. In certain embodiments, the conversion of a point cloud from a 3D representation to a 2D representation includes projecting clusters of points of the 3D point cloud onto 2D frames by creating patches. Thereafter, video codecs such as HEVC, AVC, VP9, VP8, VVC, and the like can be used to compress the 2D frames representing the 3D point cloud similar to a 2D video.

To transmit a point cloud from one device to another, the geometric positions of the points is separated from the attribute information of the points. Projections of the 3D point cloud are made with respect to different projection planes, such that the 3D point cloud is separated into multiple clusters of points which are represented as patches on 2D frames. A first set of frames can include values representing geometry positions of the points. Each additional set of frames can represent different attributes of the point cloud. For example, one attribute frame can include values representing color information associated with each of the points. A decoder reconstructs the 3D point cloud using the frames, such that the point cloud can be rendered, displayed, and then viewed by a user.

Figure 4A:
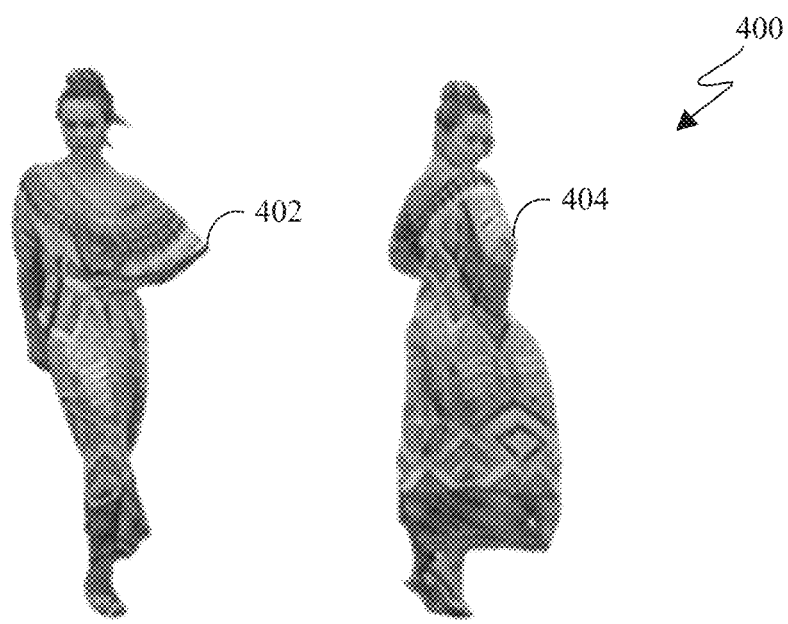
FIG. 4A illustrates an example 3D point cloud in accordance with an embodiment of this disclosure.
Figure 4B:
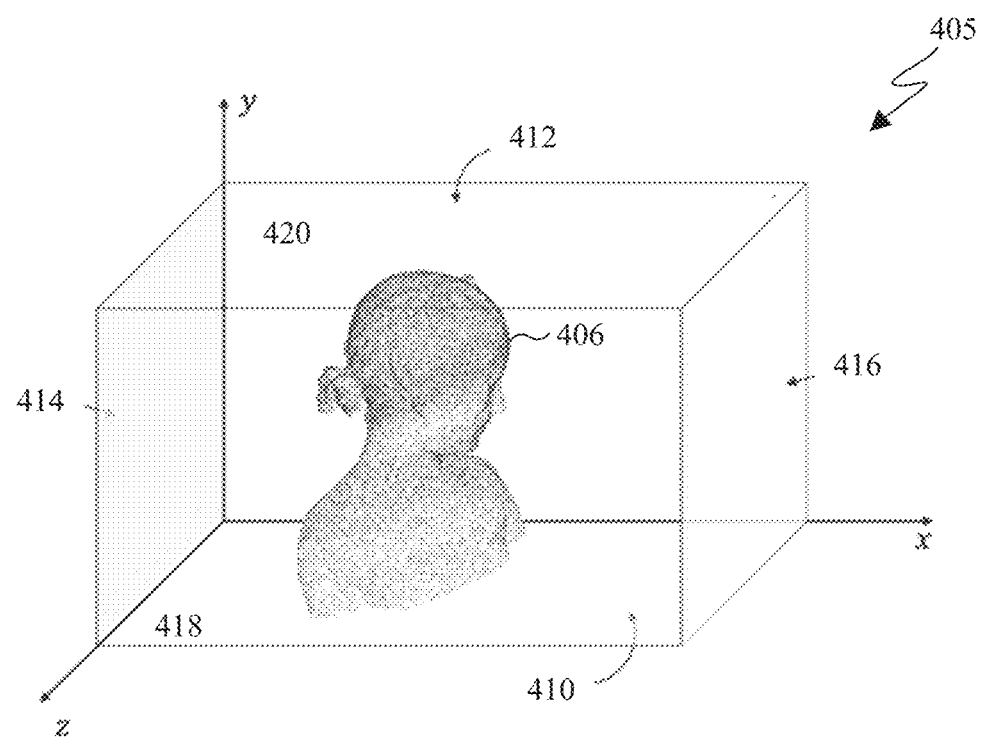
FIG. 4B illustrates a diagram of a point cloud that is surrounded by multiple projection planes in accordance with an embodiment of this disclosure.
Figure 4C:
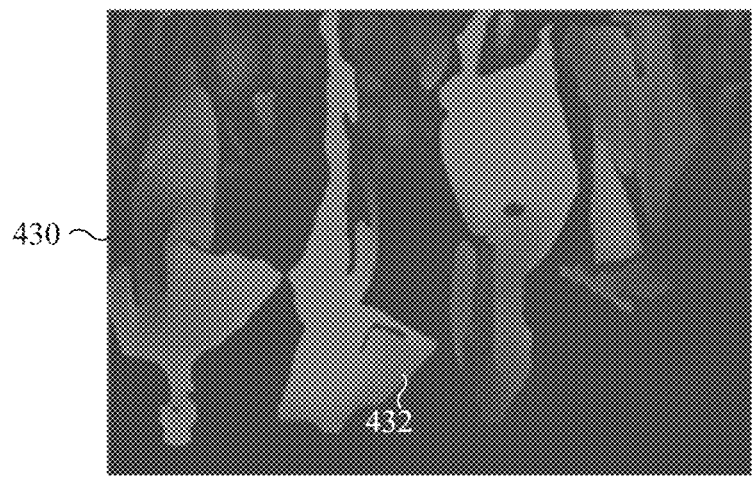
FIGS. 4C and 4D illustrate example 2D frames that include patches representing the 3D point cloud of FIG. 4A in accordance with an embodiment of this disclosure.
Figure 4D:
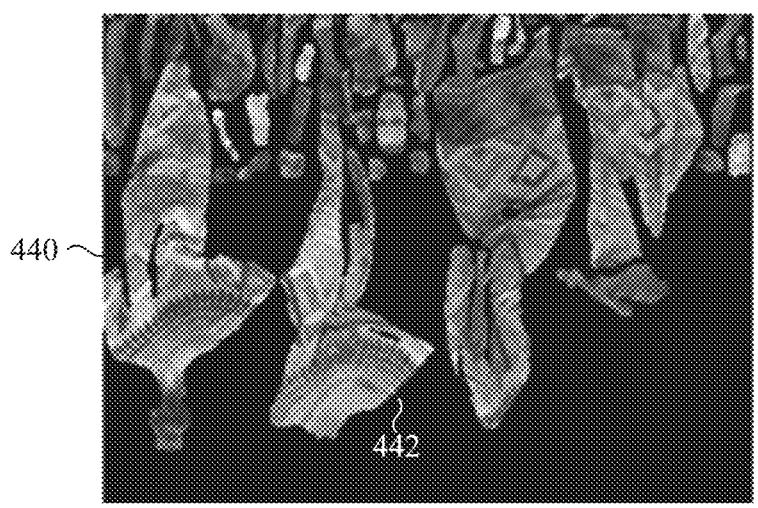

When the point cloud is deconstructed to fit on multiple 2D frames and compressed, the frames can be transmitted using less bandwidth than used to transmit the original point cloud. FIGS. 4A-4D, which are described in greater detail below, illustrate various stages of projecting a point cloud onto different plans and thereafter storing the projections into 2D frames. For example, FIG. 4A, illustrates a two views of a 3D point cloud, illustrating that a point cloud can be a 360° view of an object. FIG. 4B illustrates the process of projecting a 3D point cloud onto different planes. After the point cloud, such as the point cloud of FIG. 4A is projected onto different planes, FIGS. 4C and 4D illustrate a geometry frame and an attribute frame (which represents the color of the points of the 3D point cloud), respectively, which include patches corresponding to the various projections.

Embodiments of the present disclosure provide systems and methods for converting a point cloud into a 2D representation that can be transmitted and then reconstructed into the point cloud for rendering. In certain embodiments, a point cloud is deconstructed into multiple patches which are packed into frames. In certain embodiments, a frame includes patches of the same attributes. The points of the 3D point cloud that are represented in one patch in one frame correspond to the same points that are represented in another patch in a second frame when the two patches are positioned at over the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the points of the point cloud, such as a geometric position of the points in 3D space and color.

An encoder can separate the geometry information and the attribute information from each point. The encoder groups (or clusters) the points of the 3D point cloud with respect to different projection planes, and then stores the groups of points as patches on a 2D frames. The patches representing the geometry and attribute information are packed into geometry video frames and attribute video frames, respectively, where each pixel within any of the patches corresponds to a point in 3D space. The geometry video frames are used to encode the geometry information, and the corresponding attribute video frames are used to encode the attribute (such as color) of the point cloud. Based on a location (U, V) of a pixel in the geometry frame corresponds to a (X, Y, Z) location of a point in 3D space. For example, the two transverse coordinates (with respect to the projection plane) of a 3D point corresponds to the column and row indices in the geometry video frame (u, v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

After generating the frames, the frames can be compressed by leveraging various video compression codecs, image compression codecs, or both. For example, the encoder first generates and then compresses the geometry frames using a 2D video codec such as HEVC. To encode an attribute frame (such as the color of the 3D point cloud), the encoder decodes the encoded geometry frame, which is used to reconstruct the 3D coordinates of the 3D point cloud. The encoder smooths the reconstructed point cloud. Thereafter, the encoder interpolates the color values of each point from the color values of original point cloud. The interpolated color values are then packed into a color frame which is compressed.

The encoder can also generate an occupancy map (also referred to an occupancy map frame) which shows the location of projected points in the 2D videos frames. For example, since the patches may not occupy the entirety of the generated frames, the occupancy map indicates which pixels of the geometry frame and attribute frame correspond to a point of the point cloud and which pixels are empty/invalid and do not correspond to a point of the point cloud. In certain embodiments, the occupancy map frame is compressed. The compressed geometry frames, the compressed color frames (and any other attribute frame), and the occupancy map frame can be multiplexed to generate a bitstream. The encoder or another device then transmits the bitstream that includes the 2D frames to a different device A decoder receives the bitstream, decompresses the bitstream into the frames, and reconstructs the point cloud based on the information within the frames. After the point cloud is reconstructed, the 3D point cloud can be smoothed to improve the visual quality of the 3D point cloud. Thereafter the reconstructed 3D point can be rendered and displayed for a user to observe.

Embodiments of the present disclosure also provide systems and methods for reducing the allocated memory that is used for grid based geometry and color smoothing which are used for increasing the visual quality of the 3D point cloud. For example, smoothing the points of the 3D point cloud that correspond to pixels positioned at or near a patch boundary can improve the visual appearance of the point cloud.

For example, when a 3D point cloud is converted from a 3D representation to a 2D representation, the points of 3D point cloud are clustered into groups and projected onto frames, where the clustered points result in patches that are packed onto 2D frames. Due to the size constraints of certain 2D frames, two patches that are not next to each other on the 3D point cloud can be packed next to each other in a single frame. When two non-neighboring patches of the point cloud are packed next to each other in a 2D frame, the pixels from one patch can be inadvertently mixed up with the pixels from the other patch by the block-based video codec. Similarly, even if a patch is not next to any other patches, a valid pixel can be inadvertently mixed up with an invalid pixel (a blank space in the 2D frame, or a space that includes padding to improve the coding efficiency but does not correspond to a point of the 3D point cloud) by the block-based video codec. When pixels from one patch are inadvertently mixed up with other pixels, visible artifacts can occur at patch boundaries when the point cloud is reconstructed by the decoder. Therefore, embodiments of the present disclosure provide systems and methods for smoothing the geometry and color of the points near the patch boundary to avoid visual artifacts. Removing visual artifacts improves the visual quality of the point cloud.

To perform both attribute and geometry smoothing, embodiments of the present disclosure provide systems and methods for identifying points of the reconstructed 3D point cloud that are represented by pixels in the frames at or near a patch boundary. The identified point is referred as boundary points as these points are represented by pixels in the frames at or near a patch boundary. The boundary points can be smoothed to remove the visual artifact and thereby increasing the visual appearance of the point cloud. After identifying the boundary points the certain cells that either include a boundary point or that are in proximity to a boundary point identified and denoted as boundary cells. After identifying the boundary cells, the decoder derives a centroid of the boundary cells which are used to (i) determine whether a boundary point needs to be smoothed and (ii) smoothing the boundary point. By deriving the centroid for only the boundary cells instead of all of the cells the decoder can reduce up to 80% of allocated memory for both grid based geometry smoothing and grid based color smoothing.

In certain embodiments, attribute smoothing is tailored to color smoothing in the BT. 709 color space. Embodiments of the present disclosure also provide systems and methods for improving color smoothing by specifying criteria of when to perform attribute smoothing, such that attribute smoothing is performed for attributes that represent color. Additionally, embodiments of the present disclosure provide systems and methods for improving color smoothing by enabling color smoothing in both the YUV and RGB color domains.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit on 2D frames, compresses the frames to generate a bitstream. The bitstream can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
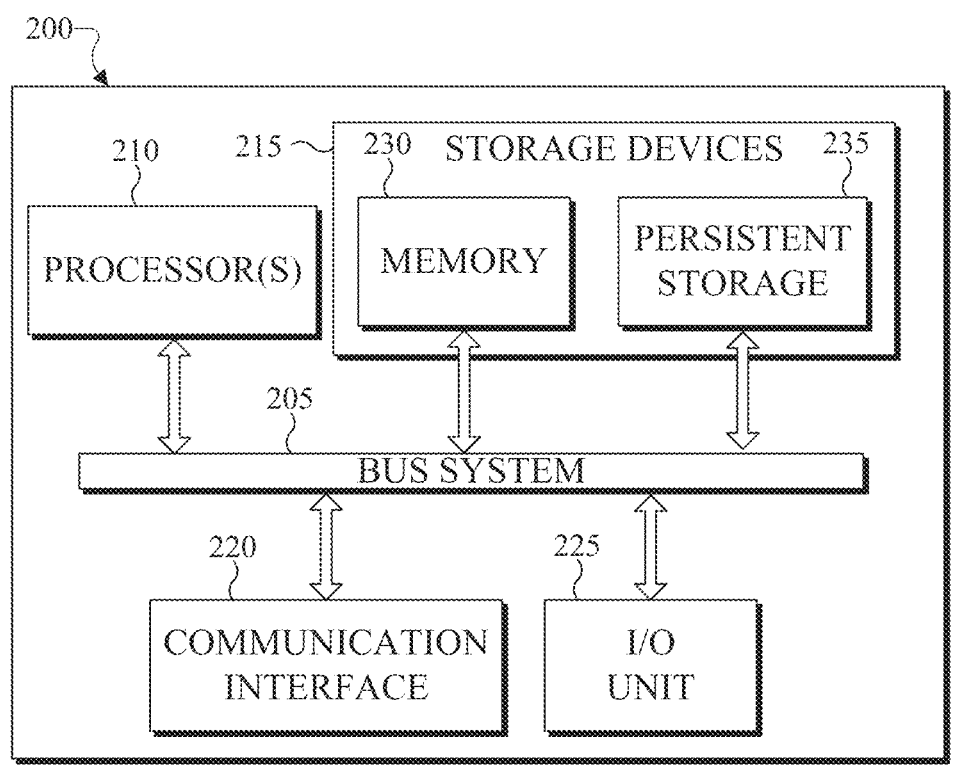
FIGS. 2 and 3 illustrate example electronic devices in accordance with an embodiment of this disclosure.
Figure 3:
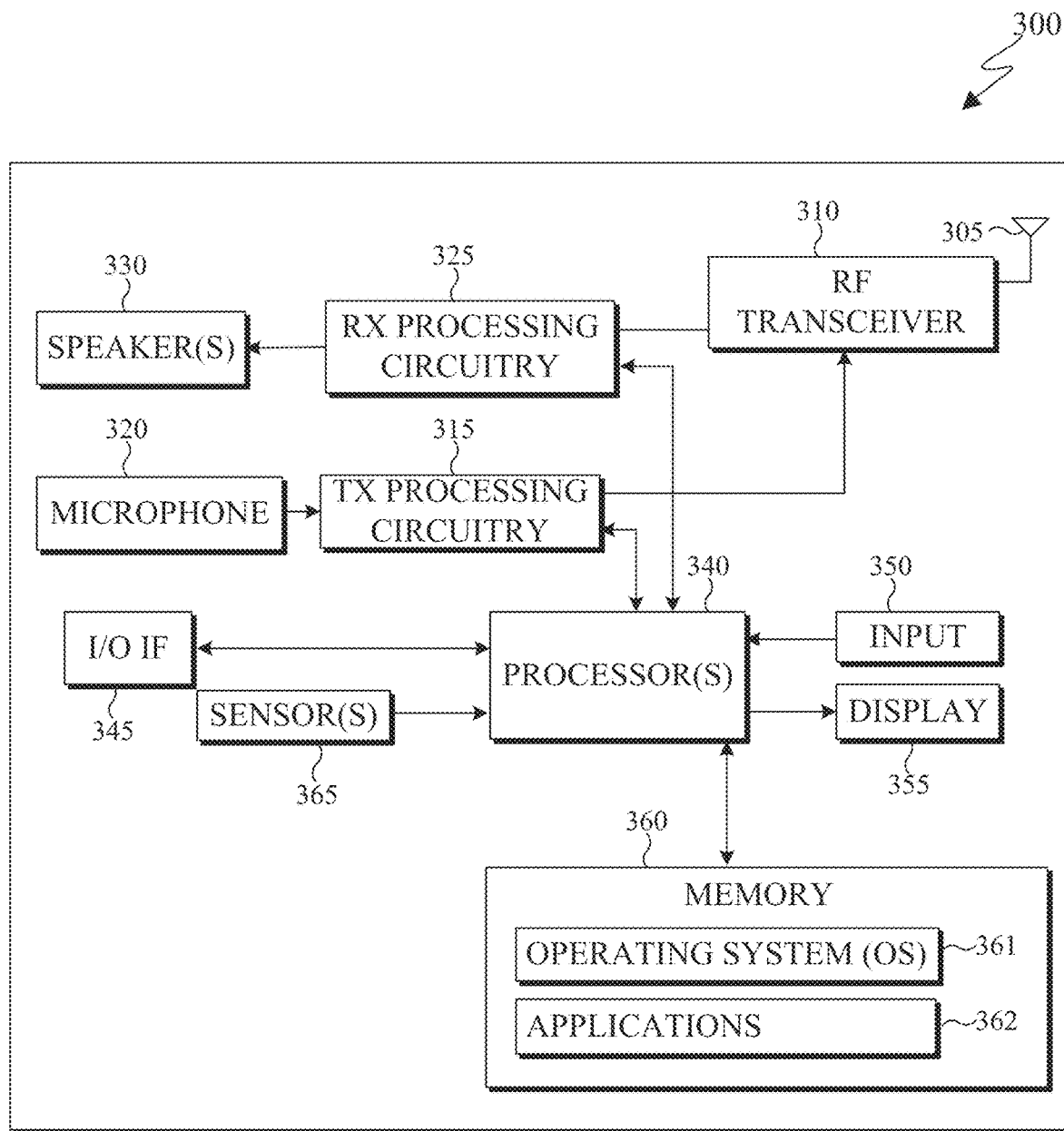

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, when the 3D point cloud is encoded by an encoder, the encoder also decodes the encoded 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image, or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 or the server 200 of FIG. 2 can project the point cloud into multiple patches. For example, a cluster of points of the point cloud can be grouped together and represented as a patch on the 2D frames. A patch can represent a single attribute of the point cloud, such as geometry, color, and the like. Patches that represent the same attribute can be packed into individual 2D frames, respectively. The 2D frames are then encoded to generate a bitstream. During the encoding process additional content such as metadata, flags, syntax elements, occupancy maps, geometry smoothing parameters, one or more attribute smoothing parameters, a patch sub-stream, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map, 2D frames, auxiliary information (such as one or more flags, one or more syntax elements, or quantization parameter size), and the like. A geometry frame can include pixels that indicate geographic coordinates of points of the point cloud in 3D space. Similarly, an attribute frame can include pixels that indicate the RGB (or YUV) color (or any other attribute) of each geometric point in 3D space. The auxiliary information can include one or more flags, one or more syntax elements, or quantization parameter size, one or more thresholds, geometry smoothing parameters, one or more attribute smoothing parameters, a patch sub-stream, or any combination thereof. After reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4E:
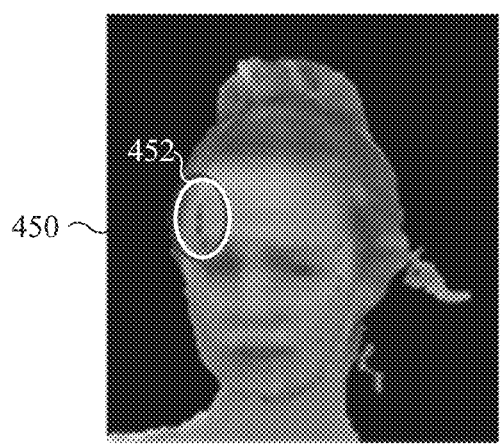
FIG. 4E illustrates an example color artifact in a reconstructed 3D point cloud in accordance with an embodiment of this disclosure.

FIGS. 4A, 4B, 4C, 4D, and 4E illustrate various stages in generating frames that represent a 3D point cloud. In particular, FIG. 4A illustrate an example 3D point cloud 400 in accordance with an embodiment of this disclosure. FIG. 4B illustrates a diagram 405 of a point cloud that is surrounded by multiple projection planes in accordance with an embodiment of this disclosure. FIGS. 4C and 4D illustrate 2D frames that include patches representing the 3D point cloud 400 of FIG. 4A in accordance with an embodiment of this disclosure. For example, the FIG. 4C illustrates a 2D frame 430 that represents the geometric position of points of the 3D point cloud 400, while the FIG. 4D illustrates the frame 440 that represents the color associated with points of the 3D point cloud 400. FIG. 4E illustrates an example color artifact in a reconstructed point cloud 450. In certain embodiments, the reconstructed point cloud 450 represents the 3D point cloud 400 of FIG. 4A, but reconstructed for rendering on a user device, while the 3D point cloud 400 of FIG. 4A can be located on a server.

The 3D point cloud 400 of FIGURE A is a set of data points in 3D space. Each point of the 3D point cloud 400 includes a geometric position that provides the structure of the 3D point cloud and one or more attributes that provide information about each point such as color, reflectiveness, material, and the like. The 3D point cloud 400 represents the entire 360° object. That is, the point cloud can be viewed from various angles such as the front 402, the sides, and the back 402, the top, the bottom.

The diagram 405 of FIG. 4B includes a point cloud 406. The point cloud 406 can be similar to the 3D point cloud 400 of FIG. 4A. That is, the point cloud 406 represents an entire 360° object. The point cloud 406 is surrounded by multiple projection planes, such as the projection plane 410, 412, 414, 416, 418, and 420. The projection plane 410 is separated from the projection plane 412 by a predefined distance. For example, the projection plane 410 corresponds to the projection plane XZ0 and the projection plane 412 corresponds to the projection plane XZ1. Similarly, the projection plane 414 is separated from the projection plane 416 by a predefined distance. For example, the projection plane 414 corresponds to the projection plane YZ0 and the projection plane 416 corresponds to the projection plane YZ1. Additionally, the projection plane 418 is separated from the projection plane 420 by a predefined distance. For example, the projection plane 418 corresponds to the projection plane XY0 and the projection plane 420 corresponds to the projection plane XY1. It is noted that additional projection planes can be included and the shape of that the projection planes form can differ.

During the segmentation process, each of the points of the point cloud 406 are assigned to a particular projection plane, (such as the projection planes 410, 412, 414, 416, 418, and 420). The points that are near each other and are assigned to the same projection plane are grouped together to form a cluster which is represented as a patch such as any of the patches as illustrated in FIGS. 4C and 4D. More or less projection plans can be used when assigning points to a particular projection plane. Moreover, the projection planes can be at various locations and angles. For example, certain projection planes can be at a 45 degree incline with respect to the other projection planes, Similarly, certain projection planes can be at a 90 degree angle with respect to other projection planes, FIGS. 4C and 4D illustrate the 2D frames 430 and 440, respectively. The frame 430 is a geometry frame as it illustrates the geometric location of each point of the 3D point cloud 400 of FIG. 4A. The frame 430 includes multiple patches (such as a patch 432) representing the depth values of the 3D point cloud 400. The value of each pixel in the frame 430 is represented as a lighter or darker color and corresponds to a distance each pixel is from a particular projection plane (such as one of the projection planes 410, 412, 414, 416, 418, and 420 of FIG. 4B).

The frame 440 is a color frame (one type of attribute) as it provides the color of each point of the 3D point cloud 400 of FIG. 4A. The frame 440 includes multiple patches (such as a patch 442) representing values corresponding to the color of a point in the 3D point cloud 400.

Each of the patches in FIGS. 4C and 4D can be identified by an index number. Similarly, each pixel within a patch can be identified by its location within the frame as well as the index number of the patch to which the pixel is within.

A correspondence (or mapping) exists between the frame 430 and the frame 440. That is, each pixel in the frame 430 corresponds to a pixel at the same location in the frame 440. Each pixel of color in the frame 440 corresponds to a particular geometry pixel in the frame 430. For example, a mapping is generated between each pixel in the frame 430 and the frame 440. For example, each pixel within the patch 432 corresponds to a point in 3D space, and each pixel within in the patch 442 provides a color to a point of the 3D point cloud that is represented at the same location in the patch 432. As shown in the frames 430 and 440, some of the pixels correspond to valid pixels that represent the 3D point cloud 400 while other pixels (the black area in the background) correspond to invalid pixels that do not represent the 3D point cloud 400.

Non-neighboring points in 3D space could end up being represented as pixels that are next to each other in the frames 430 and 440. For example, two clusters of points that are not next to each other in 3D space could be represented as patches that are adjacent to one another in the frames 430 and 440.

The frames 430 and 440 can be encoded with a video codec such as HEVC, AVC, VP9, VP8, VVC, AV1, and the like. A decoder receives a bitstream that includes the frames 430 and 440 and reconstructs the geometry of the 3D point cloud from the frame 430 and colors the geometry of the point cloud based on the frame 440 in order to generate the reconstructed point cloud 450, as shown in FIG. 4E.

The reconstructed point cloud 450 of FIG. 4E should be similar the 3D point cloud 400. When the frames 430 and 440 are encoded and compressed, the values corresponding to pixels could be mixed up by a block-based video codec. If the pixels within a single patch of the frame 430 get mixed up, the effect is often negligible when the point cloud is reconstructed as colors next to each other within a patch are often similar. However, if pixels at a boundary of one of the patches of the frame 430, such as the patch 432, get mixed up with pixels of another patch (or with pixels that do not belong to a patch, such as an invalid pixel), an artifact, similar to the artifact 452 as shown in FIG. 4E, can be created when the point cloud is reconstructed. Since the patches could be from drastically different parts of the point cloud, the coloring of the patches could be different. In a block-based video codec, a coding block may contain pixels from patches with very different coloring. This leads to leaking of color from patch to another patch with very different texture. As a result, visual artifacts are created which reduce the visual quality of the point cloud. Similarly, if pixels at a boundary of one of the patches gets mixed up with an empty pixel (indicated by the black background and does not correspond to a point of the point cloud), an artifact can be created when the point cloud is reconstructed, since a point, corresponding to a pixel that was switched with a blank pixel, would not be reconstructed.

The reconstructed point cloud 450 illustrates the artifact 452. The artifact 452 can be created when a patch corresponding to the forehead of the model represented in the 3D point cloud 400 is packed into the frame 430 (or the frame 440) next to a patch that corresponds to another part of the 3D point cloud 400, such as the dress of the model represented in the 3D point cloud 400 or an empty (invalid) pixel in the frames 430 and 440. As such, color values of a patch that represents a portion of the dress could leak to the patch corresponding to the forehead of the model represented in the 3D point cloud 400. In this example, the mix up of the color values results in an artifact that appear as a crack or hole in the face of the user which reduces the visual quality of the reconstructed point cloud 450. Embodiments of the present disclosure provide systems and methods for removing artifacts by smoothing the reconstructed point cloud at areas of an artifact while maintaining the quality of the point cloud. For example, points near patch boundaries of the reconstructed point cloud are identified and smoothed.

Although FIGS. 4A, 4B, 4C, 4D, and 4E illustrate example point cloud and 2D frames representing a point cloud various changes can be made to FIGS. 4A, 4B, 4C, 4D, and 4E. For example, a point cloud or mesh can represent a single object, whereas in other embodiments, a point cloud or mesh can represent multiple objects, scenery (such as a landscape), a virtual object in AR, and the like. In another example, the patches included in the 2D frames can represent other attributes, such as luminance, material, and the like. FIGS. 4A, 4B, 4C, 4D, and 4E do not limit this disclosure to any particular 3D object(s) and 2D frames representing the 3D object(s).

Figure 5B:
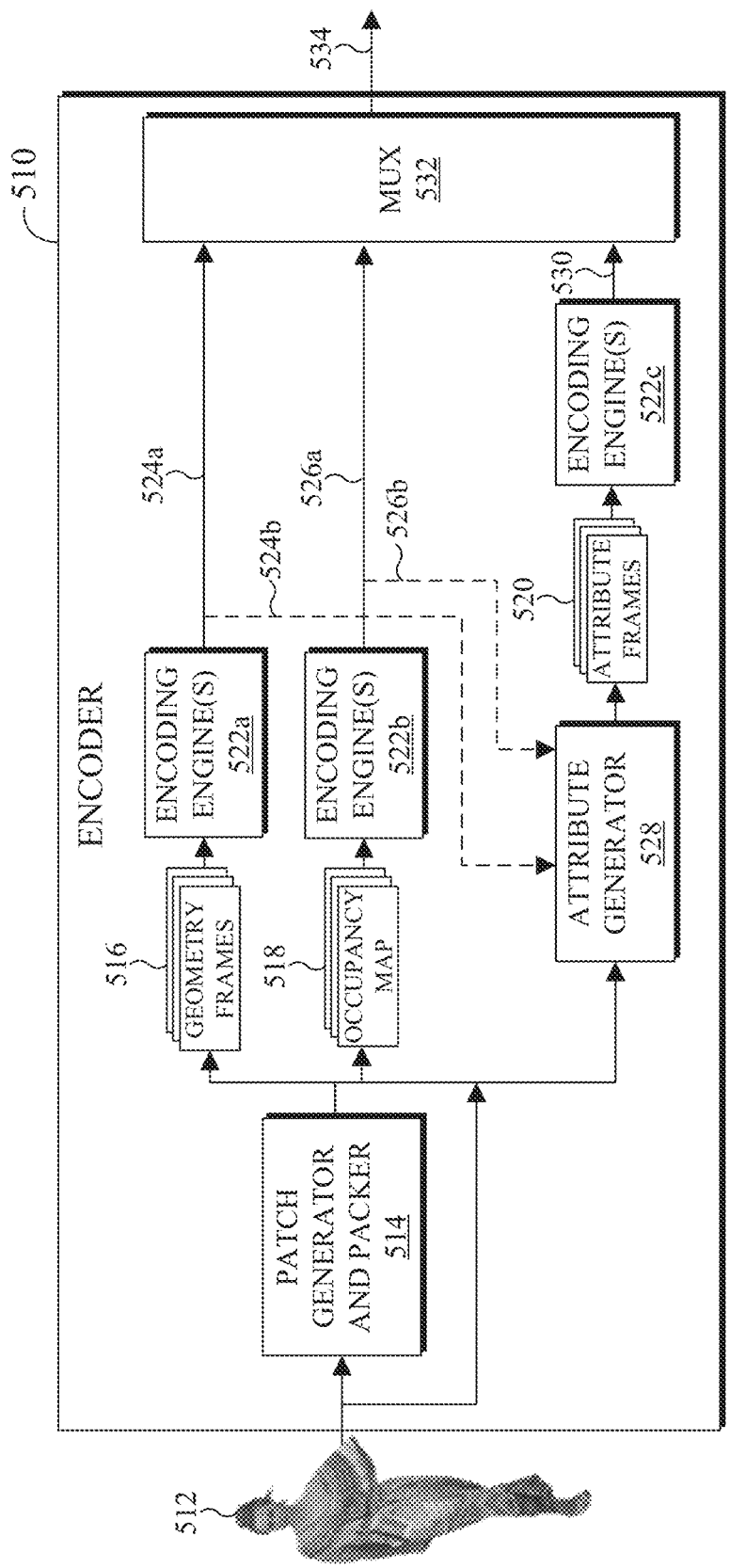
FIG. 5B illustrates an example block diagram of an encoder in accordance with an embodiment of this disclosure.
Figure 5C:
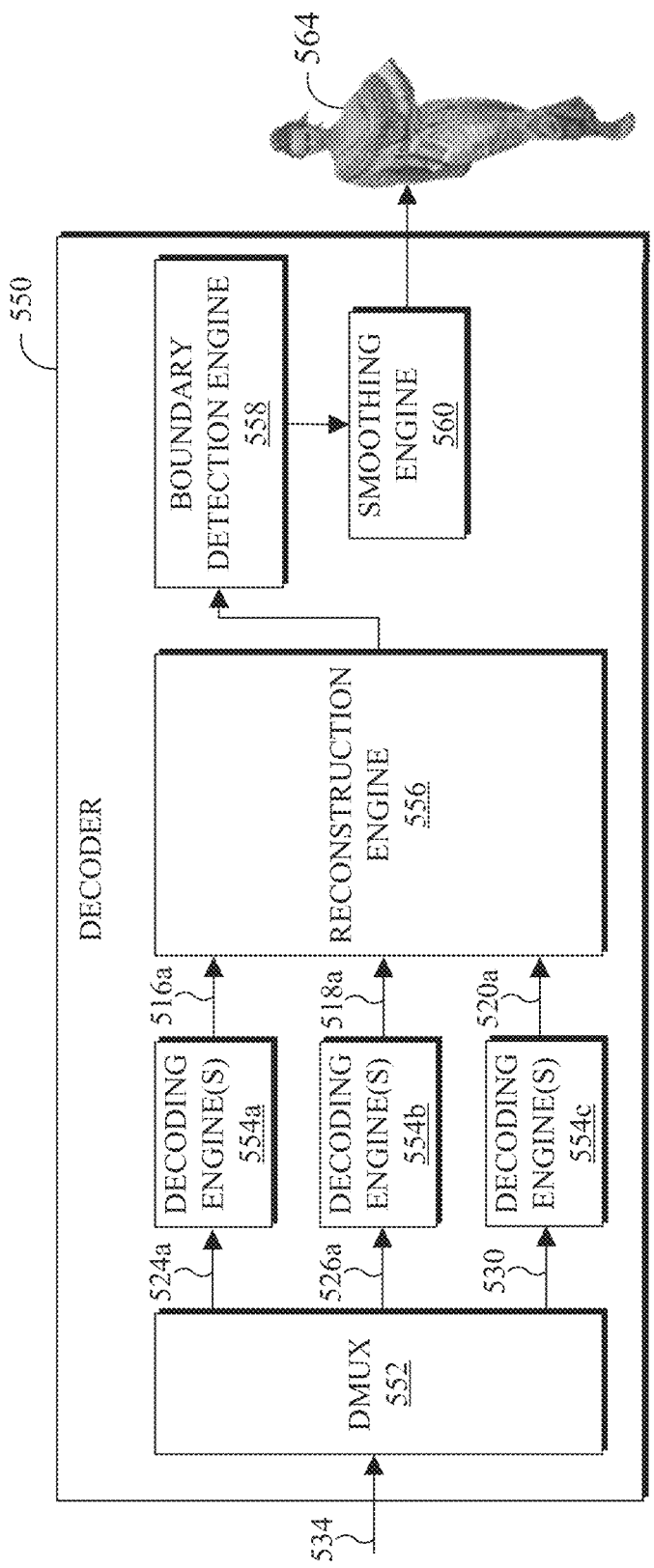
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A and FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 is described with more below in FIG. 5B. Generally, the encoder 510 receives 3D media content, such as a point cloud, from another device such as a server (similar to the server 104 of FIG. 1, the server 200 of FIG. 2) or an information repository (such as a database), or one of the client devices 106-116. In certain embodiments, the encoder 510 can receive media content from multiple cameras and stitch the content together to generate a 3D scene that includes one or more point clouds.

The encoder 510 projects points of the point cloud into multiple patches that represent the projection. The encoder 510 clusters points of a point cloud into groups which are projected onto different planes such as an XY plane, an YZ plane, and an XZ plane. Each cluster of points is represented by a patch when projected onto a plane. The encoder 510 packs and stores information representing the onto a 2D frame. The encoder 510 packs the patches representing the point cloud onto 2D frames. The 2D frames can be video frames. It is noted, a point of the 3D point cloud is located in 3D space based on a (X, Y, Z) coordinate value, but when the point is projected onto a 2D frame the pixel representing the projected point is denoted by the column and row index of the frame indicated by the coordinate (u, v). Additionally, 'u' and 'v' can range from zero to the number of rows or columns in the depth image, respectively.

Each of the 2D frames represents a particular attribute, such as one set of frames can represent geometry and another set of frames can represent an attribute (such as color). It should be noted that additional frames can be generated based on more layers as well as each additionally defined attribute.

The encoder 510 also generates an occupancy map based on the geometry frame and the attribute frame(s) to indicate which pixels within the frames are valid. Generally, the occupancy map indicates, for each pixel within a frame, whether the pixel is a valid pixel or an invalid pixel. For example, if a pixel in the occupancy map at coordinate (u, v) is valid, then the corresponding pixel in a geometry frame and the corresponding attribute frame at the coordinate (u, v) are also valid. If the pixel in the occupancy map at coordinate (u, v) is invalid, then the decoder skips the corresponding pixel in the geometry and attribute frames at the coordinate (u, v). An invalid pixel can include information such as padding that can increase the encoding efficiency but does not provide any information associated with the point cloud itself. Generally, the occupancy map is binary, such that the value of each pixel is either one or zero. For example, when the value of a pixel at position (u, v) of the occupancy map is one, indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid, and therefore does not represent a point of the 3D point cloud.

The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described in greater detail below in FIG. 5B.

The decoder 550, which is described with more below in FIG. 5C, receives a bitstream that represents media content, such as a point cloud. The bitstreams can include data representing a 3D point cloud. In certain embodiments, the decoder 550 can decode the bitstream and generate multiple frames such as one or more geometry frames, one or more attribute frames, and one or more occupancy map frames. The decoder 550 reconstructs the point cloud using the multiple frames, which can be rendered and viewed by a user The decoder 550 can identify points on the reconstructed 3D point cloud that were represented on or near a boundary of one of the patches on one of the frames.

The decoder 550 can also perform smoothing, such as geometry smoothing and attribute smoothing. To perform smoothing the decoder 550 identifies boundary points of the reconstructed 3D point cloud and then identifies boundary cells associated with the boundary points. The decoder 550 derives a centroid value of the identified boundary cells. The centroid value is used to determine determines that smoothing is necessary. When the decoder 550 determines that smoothing is necessary for a particular boundary point, based on the centroid values of the cells associated with that particular boundary point, the decoder 550 uses those centroid values to smooth the boundary point.

For example, the decoder determines whether geometry smoothing is necessary based on the distance between the query point and the output of a tri-linear filtering of the centroids. Before determining whether color smoothing is necessary, the decoder 550 first determines whether to perform color smoothing to the color frame. When attribute smoothing is determined to be performed based on the criteria, the decoder 550 determines whether color smoothing is necessary based on the color and luminance in proximity to the points near the boundary point.

FIG. 5B illustrates the encoder 510 that receives a 3D point cloud 512 and generates a bitstream 534. The bitstream 534 includes data representing a 3D point cloud 512. The bitstream 534 can include multiple bitstreams. The bitstream 534 can be transmitted via the network 502 of FIG. 5A to another device, such as the decoder 550, an electronic device that includes the decoder 550, or an information repository. The encoder 510 includes a patch generator and packer 514, one or more encoding engines (such as encoding engine 522a, 522b, and 522c, which are collectively referred to as encoding engines 522), an attribute generator 528, and a multiplexer 532.

The 3D point cloud 512 can be stored in memory (not shown) or received from another electronic device (not shown). The 3D point cloud 512 can be a single 3D object (similar to the 3D point cloud 400 of FIG. 4A), or a grouping of 3D objects. The 3D point cloud 512 can be a stationary object or an object which moves.

The patch generator and packer 514 generates patches by taking projections of the 3D point cloud 512 and packs the patches into frames. In certain embodiments, the patch generator and packer 514 splits the geometry information and attribute information of each point of the 3D point cloud 512. The patch generator and packer 514 can use two or more projection planes (such as two or more the projection plans 410-420 of FIG. 4B), to cluster the points of the 3D point cloud 512 to generate the patches. The geometry patches are eventually packed into the geometry frames 516.

The patch generator and packer 514 determines the best projection plane for each point of the 3D point cloud 512. When projected, each cluster of points of the 3D point cloud 512 appears as patch (also referred to as a regular patch). A single cluster of points can be represented by multiple patches (located on different frames), where each patch represents a particular aspect of each point within the cluster of points. For example, a patch representing the geometry locations of the cluster of points is located on the geometry frame 516, and patch representing an attribute of the cluster of points is located on the attribute frame 520.

After determining the best projection plane for each point of the 3D point cloud 512 the patch generator and packer 514 segments the points into patch data structures that are packed frames, such as the geometry frames 516. As illustrated in FIGS. 4C and 4D, discussed above, the patches are organized by attributes and places the patches within corresponding frames, such as the patch 432 is included in the geometry frame 430 and the patch 442 is included in the attribute frame 440. It is noted that patches representing different attributes of the same cluster of points include a correspondence or a mapping, such a pixel in one patch corresponds to the same pixel in another patch, based on the locations of the pixels being at the same position in the respective frames.

The patch generator and packer 514 also generates patch information (providing information about the patches, such as an index number that is associated with each patch), occupancy map frames 518, geometry frames 516 and attribute information (which is used by the attribute generator 528 to generate the attribute frames 520).

The occupancy map frames 518 represent occupancy maps that indicate the valid pixels in the frames (such as the geometry frames 516). For example, the occupancy map frames 518 indicate whether each pixel in the geometry frame 516 is a valid pixel or an invalid pixel. Each valid pixel in the occupancy map frames 518 corresponds to pixels in the geometry frames 516 that represents a position point of the 3D point cloud 512 in 3D space. In contrast, the invalid pixels are pixels within the occupancy map frames 518 correspond to pixels in the geometry frames 516 that do not represent a point of the 3D point cloud 512 (such as the empty/black space in the frames 430 and 440 of FIGS. 4C and 4D). In certain embodiments, one of the occupancy map frames 518 can correspond to both a geometry frame 516 and an attribute frame 520 (discussed below).

For example, when the patch generator and packer 514 generates the occupancy map frames 518, the occupancy map frames 518 include predefined values for each pixel, such as zero or one. For example, when a pixel of the occupancy map at position (u, v) is a value of zero, indicates that the pixel at (u, v) in the geometry frame 516 is invalid. Similarly, when a pixel of the occupancy map at position (u, v) is a value of one, indicates that the pixel at (u, v) in the geometry frame 516 is valid and thereby includes information representing a point of the 3D point cloud.

The geometry frames 516 include pixels representing the geometry values of the 3D point cloud 512. The geometry frames 516 include the geographic location of each point of the 3D point cloud 512. The geometry frames 516 are used to encode the geometry information of the point cloud. For example, the two transverse coordinates (with respect to the projection plane) of a 3D point corresponds to the column and row indices in the geometry video frame (u, v) plus a transverse-offset which indicates the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

The encoder 510 includes one or more encoding engines 522. In certain embodiments, the frames (such as the geometry frames 516, the occupancy map frames 518, and the attribute frames 520) are encoded by independent encoding engines 522, as illustrated. In other embodiments, a single encoding engine performs the encoding of the frames. In other embodiments, The encoding engines 522 can be configured to support an 8-bit, a 10-bit, a 12-bit, a 14-bit, or a 16-bit, precision of data. The encoding engines 522 can include a video or image codec such as HEVC, AVC, VP9, VP8, VVC, EVC, AV1 and the like to compress the 2D frames representing the 3D point cloud. The one or more of the encoding engines 522 can compress the information in a lossy or lossless manner.

As illustrated, the encoding engine 522a receives geometry frames 516 performs geometry compression to generate a geometry sub-stream 524a. The encoding engine 522b receives occupancy map frames 518 performs occupancy map compression to generate an occupancy map sub-stream 526a. The encoding engine 522c receives attribute frames 520 performs attribute compression to generate an attribute sub-stream 530.

After the encoding engine 522a generates the geometry sub-stream 524a, a decoding engine (not shown) can decode the geometry sub-stream 524a to generate the reconstructed geometry frames 524b. Similarly, after the encoding engine 522b generates the occupancy map sub-stream 5246, a decoding engine (not shown) can decode the occupancy map sub-stream 526a to generate the reconstructed occupancy map frames 526b.

The attribute generator 528 generates the attribute frames 520 based on the attribute information from the 3D point cloud 512, the reconstructed geometry frames 524b, the reconstructed occupancy map frames 526b, and information provided by the patch generator and packer 514.

For example, to generate one of the attribute frames 520 that represent color, the geometry frames 516 are compressed by the encoding engine 522a using a 2D video codec such as HEVC. The geometry sub-stream 524a is decoded to generate the reconstructed geometry frames 524b. Similarly, the occupancy map frame 518 is compressed using the encoding engine 522b and then decompressed to generate the reconstructed occupancy map frames 526b. The encoder 510 can then reconstruct the geometric locations of the points of the 3D point cloud based on the reconstructed geometry frames 524b and the reconstructed occupancy map frames 526b. The attribute generator 528 interpolates the attribute values (such as color) of each point from the color values of input point cloud to the reconstructed point cloud and the original point cloud 512. The interpolated colors are then segmented, by the attribute generator 528, to match the same patches as the geometry information. The attribute generator 528 then packs interpolated attribute values into an attribute frame 520 representing color.

The attribute frames 520 represents different attributes of the point cloud. For example, for one of the geometry frames 516 there can be one or more corresponding attribute frames 520. The attribute frame can include color, texture, normal, material properties, reflection, motion, and the like. In certain embodiments, one of the attribute frames 520 can include color values for each of the geometry points within one of the geometry frames 516, while another attribute frame can include reflectance values which indicate the level of reflectance of each corresponding geometry point within the same geometry frame 516. Each additional attribute frame 520 represents other attributes associated with a particular geometry frame 516. In certain embodiments, each geometry frame 516 has at least one corresponding attribute frame 520.

The multiplexer 532 combines the patch sub-stream, the geometry sub-stream 524a, the occupancy map sub-stream 526a, and the attribute sub-stream 530, to create the bitstream 534.

FIG. 5C illustrates the decoder 550 that includes a demultiplexer 552, one or more decoding engines, a reconstruction engine 556, a boundary detection engine 558, and a smoothing engine 560.

The decoder 550 receives a bitstream 534, such as the bitstream that was generated by the encoder 510. The demultiplexer 552 separates bitstream 534 into one or more sub-streams representing the different information. For example, the demultiplexer 552 separates various streams of data such into the individual sub-streams such as the patch sub-stream, the geometry sub-stream 524a, the occupancy map sub-stream 526a, and the attribute sub-stream 536.

The decoder 550 includes one or more decoding engines. For example, the decoder 550 can include the decoding engine 554a, a decoding engine 554b, a decoding engine 554c, and a decoding engine 554d (collectively referred to as the decoding engines 554). In certain embodiments, a single decoding engine performs the operations of all of the individual decoding engines 554.

The decoding engine 554a decodes the geometry sub-stream 524a into reconstructed geometry frames 516a. The reconstructed geometry frames 516a are similar to the geometry frames 516 of FIG. 5B, with the different being that one or more pixels may have shifted due to the encoding and decoding of the frames.

The decoding engine 554b decodes the occupancy map sub-stream 526a into reconstructed occupancy map frames 518a. The reconstructed occupancy map frames 518a are similar to the occupancy map frames 518 of FIG. 5B, with the different being that one or more pixels may have shifted due to the encoding and decoding of the frames.

The decoding engine 554c decodes the attribute map sub-stream 530 into reconstructed attribute frames 520a. The reconstructed attribute frames 520a are similar to the occupancy map frames 520 of FIG. 5B, with the different being that one or more pixels may have shifted due to the encoding and decoding of the frames.

After the patch information, the reconstructed geometry frames 516a, the reconstructed occupancy map frames 518a, and the reconstructed attribute frames 520a are decoded, the reconstruction engine 556 generates a reconstructed point cloud. The reconstruction engine 556 reconstructs the point cloud.

When the geometry frames 516, the occupancy map frames 518, and the attribute frames 520, are encoded by the encoding engines 522, and later decoded at the decoder 550, pixels from one patch can be inadvertently be switched with a pixel of another patch or an invalid pixel. As a result, visible artifacts can appear in the reconstructed point cloud, reducing the visual quality of the point cloud. For example, pixels within the reconstructed geometry frame 516a can shift slightly due to the encoding and decoding process. Generally when the pixel is in the middle of a patch, a slight shift may not significantly reduce the visual quality of the point cloud. However, a slight shifting or switching of a pixel off of a patch to a location that is indicated as empty (or invalid) by the occupancy map, can cause considerable artifacts, since a portion of the image would not be rendered. Similarly, a slight shifting or switching of a pixel from one patch to another patch can cause considerable artifacts. For example, if one patch, which includes the face of the 3D point cloud 400 of FIG. 4A, is packed next to a patch that includes the dress of the 3D point cloud 400 and the encoding/decoding process results with a grouping of pixels moving from one patch to the other, then the reconstructed point cloud would have a pixels corresponding to a face on the dress and conversely, pixels corresponding to the dress on the face of the reconstructed and rendered point cloud. Such a shift could cause a visible artifact that reduces the visual quality of the point cloud.

In order to reduce the appearance of artifacts, points of the reconstructed 3D point cloud that are represented in the 2D frames as pixels which are near a boundary of a patch can be smoothed. To reduce the occurrence or appearance of a visual artifact and increase compression efficiency, the smoothing can be applied to the positions of the points of the point cloud, each identified attribute of the point cloud (such as color, reflectiveness, and the like), or both the geometry and the attributes of the point cloud.

In order to smooth the geometry, the attribute, or both the geometry and attribute of the 3D point cloud, the boundary detection engine 558 identifies the certain points of the 3D point cloud, denoted as boundary points. The boundary points of the 3D point cloud correspond to pixels of the reconstructed geometry frames 516a (or the reconstructed attribute frames 520) which are positioned at or near the boundary of each patch (based on the corresponding pixels in the reconstructed occupancy map frames 518a). The boundary detection engine 558 identifies the boundary points of the reconstructed point cloud, based on the values of the pixels within the reconstructed occupancy map frames 518a. For example, the boundary detection engine 558 identifies a boundary pixel within reconstructed occupancy map frames 518a.

To find a boundary pixel, the reconstructed occupancy map frames 518a inspects the values of the pixels in reconstructed occupancy map frames 518a to identify a valid pixel that is adjacent to an invalid pixel. For instance, the boundary detection engine 558 identifies a pixel with a value one, that is located adjacent to a pixel with a value of zero. An adjacent pixel can be one of the eight neighboring pixels (except if that pixel is located on the boundary of the occupancy map frame 518a).

To identify a boundary point of the point cloud, the boundary detection engine 558 inspects the pixels within the reconstructed occupancy map frames 518a. The boundary detection engine 558 inspects the reconstructed occupancy map frames 518a to identify a subset of pixels that are valid (based on the value) but are adjacent (neighbor) a pixel that is invalid (based on its value). For example, the boundary detection engine 558 inspects each pixel within the occupancy map frames 518. The inspection includes selecting a query pixel and identifying whether the query pixel is valid, based on the value of the query pixel. If the query pixel is invalid, the boundary detection engine 558 continues selecting new pixels within the occupancy map frames 518 until a valid query pixel is identified.

In certain embodiments, the boundary detection engine 558 identifies a boundary pixel based on a valid pixel being within a threshold distance from an invalid pixel. For example, the distance can include pixels within one-pixel distance from a query pixel, two-pixel distance from the query pixel, three-pixel distance from the query pixel, and the like. As the distance increases, the number of identified boundary points will also increase.

Upon identifying a boundary pixel, the boundary detection engine 558 identifies a corresponding pixel in the reconstructed geometry frame 516a that is positioned at the same location that the boundary pixel (of the occupancy map) is located. Thereafter, the boundary detection engine 558 identifies the point of the 3D point cloud that corresponds to the corresponding pixel in the reconstructed geometry frame 516a. That is, there is a correspondence between the identified boundary pixel of the reconstructed occupancy map frame 518a and a point in 3D space based on the correspondence between a pixel in the reconstructed occupancy map frame 518a and a pixel at the same location in the reconstructed geometry map frame 516a.

In addition to identifying the boundary points of the reconstructed point cloud the decoder 550 also splits the reconstructed point cloud into a 3D grid. The 3D grid includes multiple non-overlapping cells. The reconstructed point cloud is located within the 3D grid, such that the points of the 3D point cloud are located throughout the cells of the 3D grid. For example, the decoder 550 generates a 3D grid around the reconstructed point cloud 602. The shape and size of the cells can be uniform throughout the grid or change from cell to cell. FIG. 7B illustrates an example grid.

The decoder 550 then identifies specific cells of the grid that include the identified boundary points. That is, for each boundary point, the corresponding cell of the 3D grid is identified. The decoder also identifies certain neighboring cells that are adjacent to each of the cells that include the identified boundary points.

For example, for a query cell with a single boundary point and multiple other points, the decoder identifies seven other cells that are adjacent to the query cell. It is noted that a single cell has twenty six neighboring (adjacent) cells. The decoder 550 selects a predetermined number of the neighboring cells which are geometrically closest to the boundary point that is within the query cell. For example, the if the boundary point is in the lower left part of the cell, then the decoder 550 selects the neighboring cells that are located to the left and below the current cell. In certain embodiments, the predetermined number of cells that neighbor the cell with the query point is seven neighboring cells. The neighboring cells and the query cell, which includes the boundary point, are denoted as boundary cells. As such, in certain embodiments, there are a total of eight boundary cells (the seven neighboring cells and the query cell). In other embodiments, different number of cells can be identified as boundary cells.

The decoder 550 identifies the centroid for each of the boundary cells (the query cell that includes the boundary point and neighboring cells based on the position of the boundary point within the query cell), after selecting a predetermined number of boundary cells. The centroid of each boundary cell is based on the points included in each respective cells. The centroid for each of the boundary cells are stored in a look up table.

After the boundary points of the reconstructed point cloud are identified, the boundary cells are identified, and the centroid of the boundary cells are identified, the smoothing engine 560 determines whether to perform the smoothing with respect to each identified boundary point. In certain embodiments, the smoothing engine 560 performs the attribute smoothing differently than the geometry smoothing.

For example, with respect to geometry smoothing, the smoothing engine 560 performs a tri-linear filtering of the centroids. A tri-linear filter is applied to the centroids of each boundary cell (the cell that includes the boundary point and a predetermined number of neighboring cells) to find the smoothed geometry for each boundary point. The smoothing engine 560 determines whether the distance between a single boundary point and the filter output is larger than a threshold. When the distance between a single boundary point and the filter output is larger than the threshold, the smoothing engine 560 replaces the value of the boundary point with the output of the tri-linear filter. Alternatively, when the distance between a single boundary point and the filter output is less than the threshold, the smoothing engine 560 determines that no geometry smoothing is necessary for the boundary point.

With respect to attribute smoothing, the smoothing engine 560 applies a set of criteria to determine whether attribute smoothing is applied. First, attribute smoothing is applied to one of the reconstructed attribute frames 520a when the attribute type is texture. That is, if none of the reconstructed attribute frames 520a are texture, then the smoothing engine 560 determines to not apply any attribute smoothing. Second, attribute smoothing is applied to the reconstructed attribute frame 520a that corresponds to an attribute type of texture, when the number of components of that frame are either one or three. The number of components of that frame are one when it is a monochrome color (such as black and white). The number of components of that frame are three when it is in RGB or YUV or another tri-stimulus color space. Third, attribute smoothing is applied to the reconstructed attribute frame 520a when a flag (or SEI message or syntax element) is identified that specifies attribute smoothing is enabled. That is, if one of the reconstructed attribute frames 520a represents texture that includes either a single color component or three color components, and a flag (or syntax element) is identified that indicates attribute smoothing is enabled, then the smoothing engine 560 determines to apply any attribute smoothing. If any of the three criteria are not present, then the smoothing engine 560 determines to not perform any attribute smoothing.

When the smoothing engine 560 determines to perform attribute smoothing, the smoothing engine 560 uses the first component (zeroth (0th) component) of the decoded color video frames (part of the reconstructed attribute frames 520a) to make the color smoothing decisions. When the decoded color video frames are in the YUV format, the first component (zeroth (0th) component) would be the Y component. When the decoded color video frames are in the RGB format, the first component (zeroth (0th) component) may be the G component. This is because when video in RGB format is compressed directly, without conversion to YUV or YCbCr format), the color components are often ordered as Green-Blue-Red (GBR), since green component is very similar to the luminance (Y) component of a video in YUV format and most video codecs are optimized for a YUV or YCbCr format.

For example, when the decoded frame is RGB 444 (8-bit) format the smoothing engine 560 performs the attribute smoothing with smoothing decisions based on the zeroth (0th) component, which is generally the G component. Alternatively, when the decoded frame is YUV 420 (8-bit) format, the smoothing engine 560 first performs a chroma up sampling to generate frames in the YUV 444 format. To retain precision, the frames in YUV 444 format may be stored in 16-bit precision. Thereafter, the smoothing engine 560 performs the attribute smoothing with smoothing decisions based on the zeroth (0th) component, which is the Y component. After performing the smoothing based on the Y component, the smoothing engine 560 then converts the YUV 444 (16-bit) format to an RGB 444 (8-bit) format. That is depending on the initial format of attribute frame associated that includes the information, which is to be smoothed, the smoothing engine 560, performs the smoothing slightly differently.

In order to perform the smoothing, based on the RGB 444 format or the YUV 444 format, the smoothing engine 560 determines whether to exclude certain identified boundary cells, from the attribute smoothing, based on luma variations. For example, the smoothing engine 560 determines to exclude boundary cells with internal luma variations that exceed a threshold. Also the smoothing engine 560 determines to exclude boundary cells whose luma difference between the neighboring boundary cells of the query cell that includes the boundary point is larger than another threshold. That is, if the luma variations in a cell is larger than a threshold, then that cell is excluded from smoothing.

In order to measure the variation of luma in a cell, the difference between the median and the mean of luma is compared against a threshold. If this difference is greater than the threshold, that cell will be excluded from smoothing. If the difference between the color centroid of the current cell (containing the boundary point) and the color centroid of a neighboring cell is greater than a threshold, that neighboring cell will be excluded from smoothing.

The variation of luma in a cell the difference of the median and the mean luma. Since the zeroth (0th) component is used for making decisions, the median of zeroth (0th) component of points in a cell and mean of the zeroth (0th) component of points in a cell are used.

After identifying the cells that are used for color smoothing, the smoothing engine 560 applies a tri-linear filter to the color centroid of a cell that contains the boundary point and the remaining neighboring cells. If the difference between the color of the boundary point and the derived smoothed color is larger than a threshold, the color of the query point will be replaced by the smooth color. Alternatively, if the difference between the color of the boundary point and the derived smoothed color is less than the threshold, no color smoothing is performed to the boundary point.

After performing the geometry smoothing and/or the attribute smoothing (or determining not to perform the attribute smoothing) the decoder 550 can render the reconstructed point cloud 564.

After the reconstruction engine 556 reconstructs the point cloud and the smoothing engine 560 determines whether to perform geometry and attribute smoothing, (and based on a determination to perform the smoothing to remove artifacts that were inadvertently created while the frames were encoded and decoded), the decoder 550 renders the reconstructed point cloud 564. The reconstructed point cloud 568 is rendered and displayed on a display or a head mounted display, similar to the HMD 116 of FIG. 1. The reconstructed point cloud 568 is similar to the 3D point cloud 512.

Although FIG. 5A illustrate the environment-architecture 500, FIG. 5B illustrates the encoder 510, and FIG. 5C illustrates the decoder 550, various changes can be made to FIGS. 5A, 5B, and 5C. For example, any number of encoders or decoders can be included environment-architecture 500.

Figures 6A, 6B:
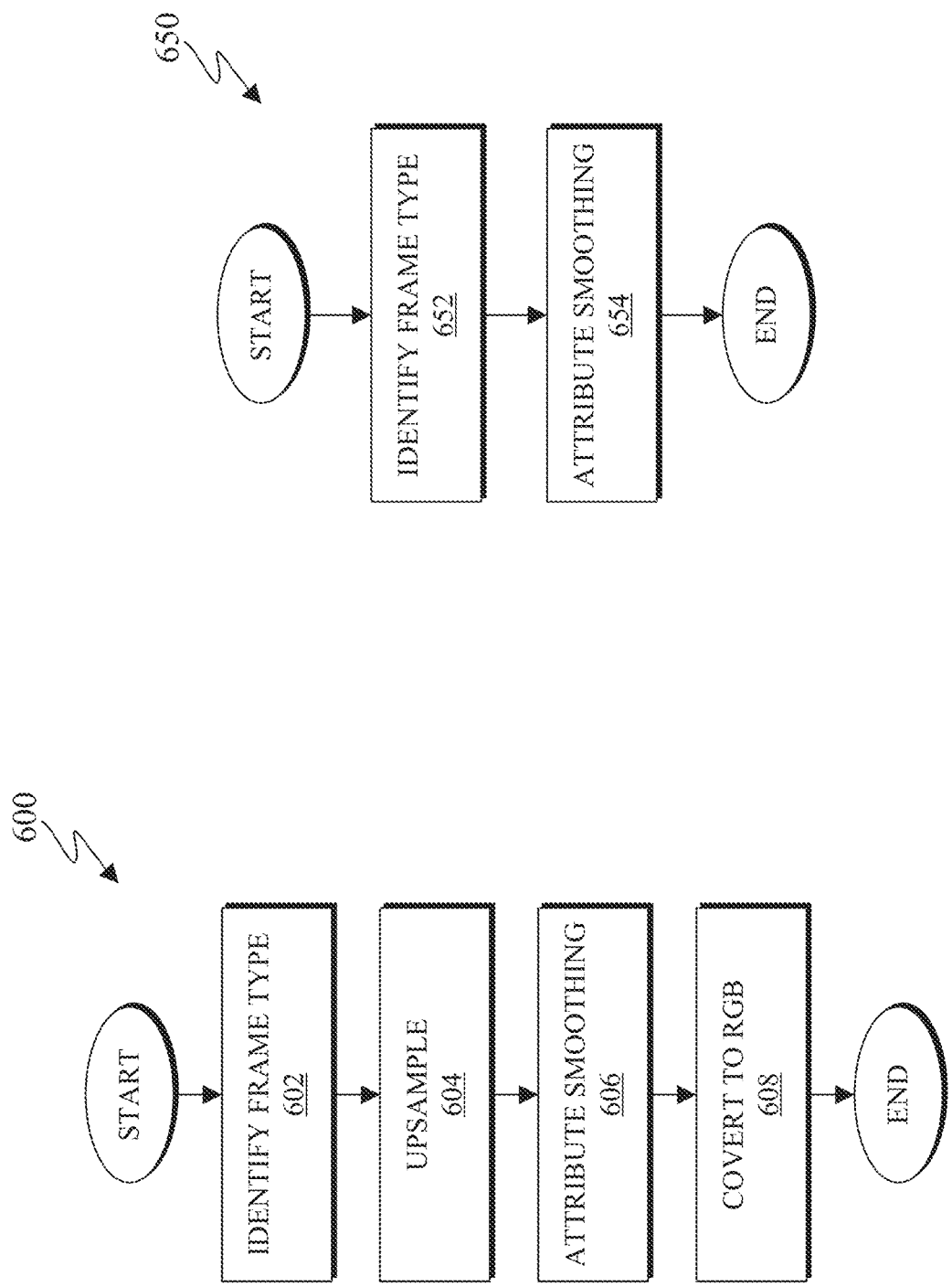
FIGS. 6A and 6B illustrate example methods for attribute smoothing in accordance with an embodiment of this disclosure.

FIGS. 6A and 6B illustrate example methods for attribute smoothing in accordance with an embodiment of this disclosure. In FIG. 6A the decoder 550 receives the attribute video frame in a YUV 420 format, while in FIG. 6B, the decoder 550 receives the attribute video frame in an RGB 444 format.

The methods of FIGS. 6A and 6B can be performed by the sever 104 or any of the client devices 106-116 of FIG. 1, the server 200 of FIG. 2, the electronic device 300 of FIG. 3, the encoder 510 of FIGS. 5A and 5B, the decoder 550 of FIGS. 5A and 5C, or any other suitable device or system. For ease of explanation, the methods FIGS. 6A and 6B are described as being performed by the boundary decoder 550 FIGS. 5A and 5C.

Different aspects of a point cloud that are encoded and decoded can be represented on different sets of attribute frames, such as the frames 530 of FIG. 5A. For example, a set of attribute frames can represent texture (color), another set of the attribute frames can represent reflectance, an additional set of the attribute frames can represent transparency, yet another set of the attribute frames can represent normal, and the like. One or more of these sets of attribute frame frames can be generated by the encoder 510 and included in the bitstream in addition to the geometry frames and the occupancy map frames. Additionally, when a set of attribute frames representing texture (color), these frames can be either direct input into the video codec as an RGB format or coded in a YUV format. The smoothing process is based on various criteria, and the format that the attribute frame is encoded. As described below, the term color smoothing is used interchangeably with the term texture smoothing.

The decoder 550 determines to perform smoothing to a set of the attribute frames when the following conditions (criteria) are satisfied. That is, before performing the attribute smoothing, the decoder 550 determines whether color smoothing is needed based on satisfying the three criteria. First, the decoder 550 determines whether to perform color smoothing based on the type of the attribute frames. Since, a point cloud can be represented on the frames using different types of attributes (such as, transparency, normal, and the like), color smoothing is performed to an attribute video (the attribute video is composed of a set of attribute frames) when the attribute frame type of the attribute video is texture or color. That is, the decoder 550 does not perform color smoothing to any of the frames of the attribute video that is not identified as texture or color. For example, if the only attribute in the attribute video is normal, there is no need to perform color smoothing. Second, the decoder 550 determines that color smoothing is to be performed based on the number of color components of the attribute frame. The decoder 550 identifies the number of color components of the set of frames representing the texture. The number of the color components of the attribute frame that represents texture is 1 or 3 in order to perform color smoothing. Finally, the decoder 550 determines that color smoothing is to be performed based on whether a flag (syntax element) is present in the bitstream. Accordingly, after the decoder 550 determines that the attribute type is Texture, the number of color components (attribute dimension) is one or three, and a flag (syntax element) that indicates smoothing is enabled, the decoder 550 performs the method 600 or 650.

In the method 600 of FIG. 6A, the decoder 550 receives the attribute video which is coded in a YUV 420 format. In step 602, the decoder 550 identifies that the frame type is YUV 420 (8-bit). In step 604, the chroma components of the frame are up sampled to bring video to YUV 444 format. The YUV 444 frame may be stored as 16 bit to retain higher precision before conversion to the RGB format. In step 606, the decoder 550 performs the attribute smoothing by using the Y component (since the Y component is the zeroth component) to make smoothing decisions. In step 608 the decoder then converts the smoothed YUV 444 frame to an RGB 444 frame (8-bit). The RGB 444 frame is used to render the point cloud. In certain embodiments, the original texture may be 10-bit or 12-bit instead of 8-bit, in which case the YUV 444 to RGB 444 conversion would produce a 10-bit RGB 444 or a 12-bit RGB 444 frame, respectively.

In the method 650, of FIG. 6B, the decoder 550 receives the attribute frame. In step 652, the decoder 550 identifies that the frame type is RGB 444 (8-bit). In step 654, the decoder 550 performs the attribute smoothing by using the zeroth (0th) component, which may be the green component (G) since direct coding in RGB format is typically performed by reordering the color components as GBR (since the G component is the closest to the luminance (Y) component of a YUV or YCbCr format frame) to make smoothing decisions. Method 650, of FIG. 6B, would be applicable if instead of RGB 444 format, attribute video in another tri-stimulus color format is coded directly using a video codec.

Although FIGS. 6A, and 6B illustrates one example of performing attribute smoothing, various changes can be made to FIGS. 6A, and 6B. For example, while shown as a series of steps, various steps in FIGS. 6A, and 6B could overlap, occur in parallel, or occur any number of times.

Figure 7A:
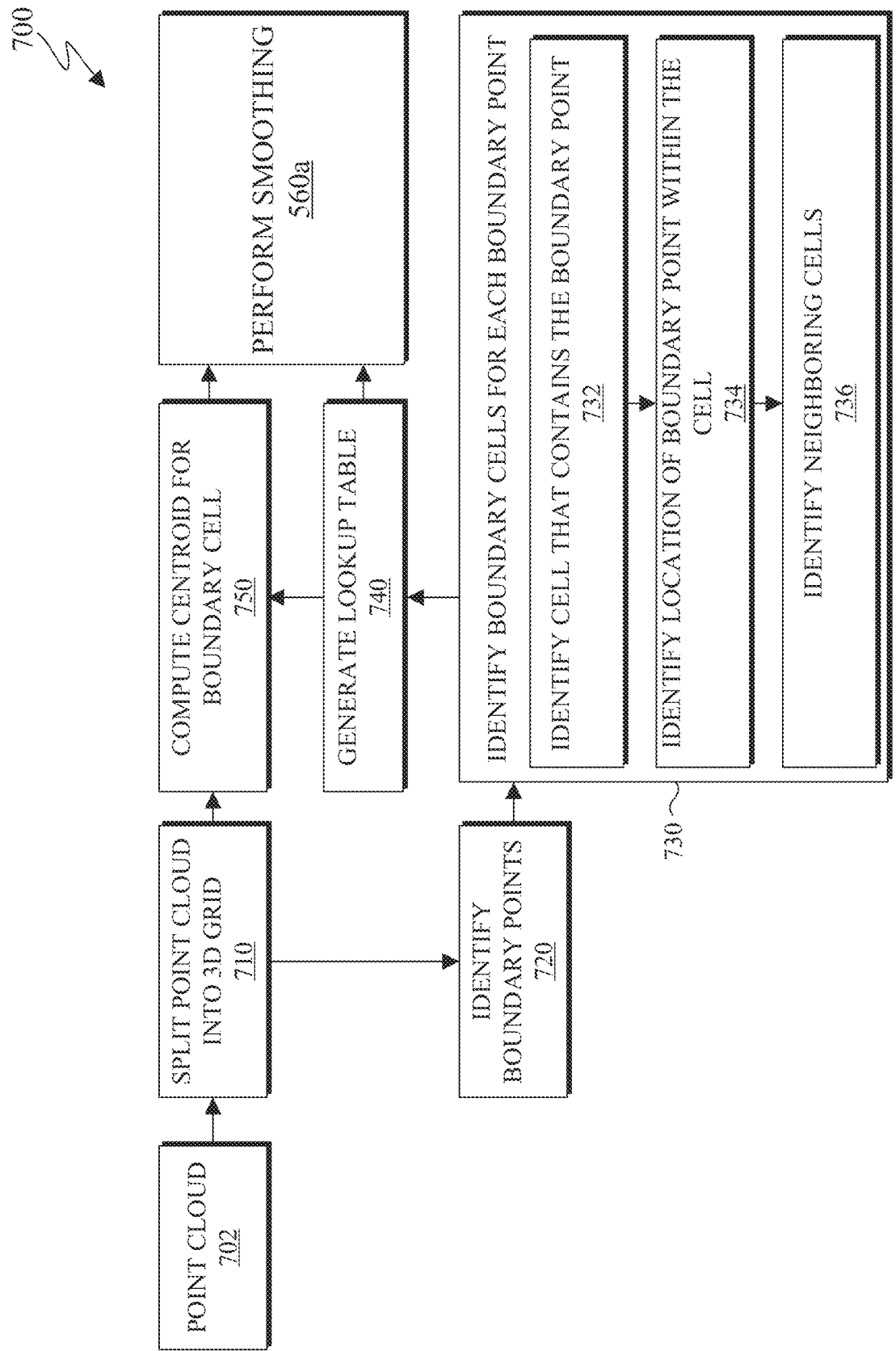
FIG. 7A illustrates an example method for selecting certain centroids that are used to perform smoothing in accordance with an embodiment of this disclosure.
Figure 7B:
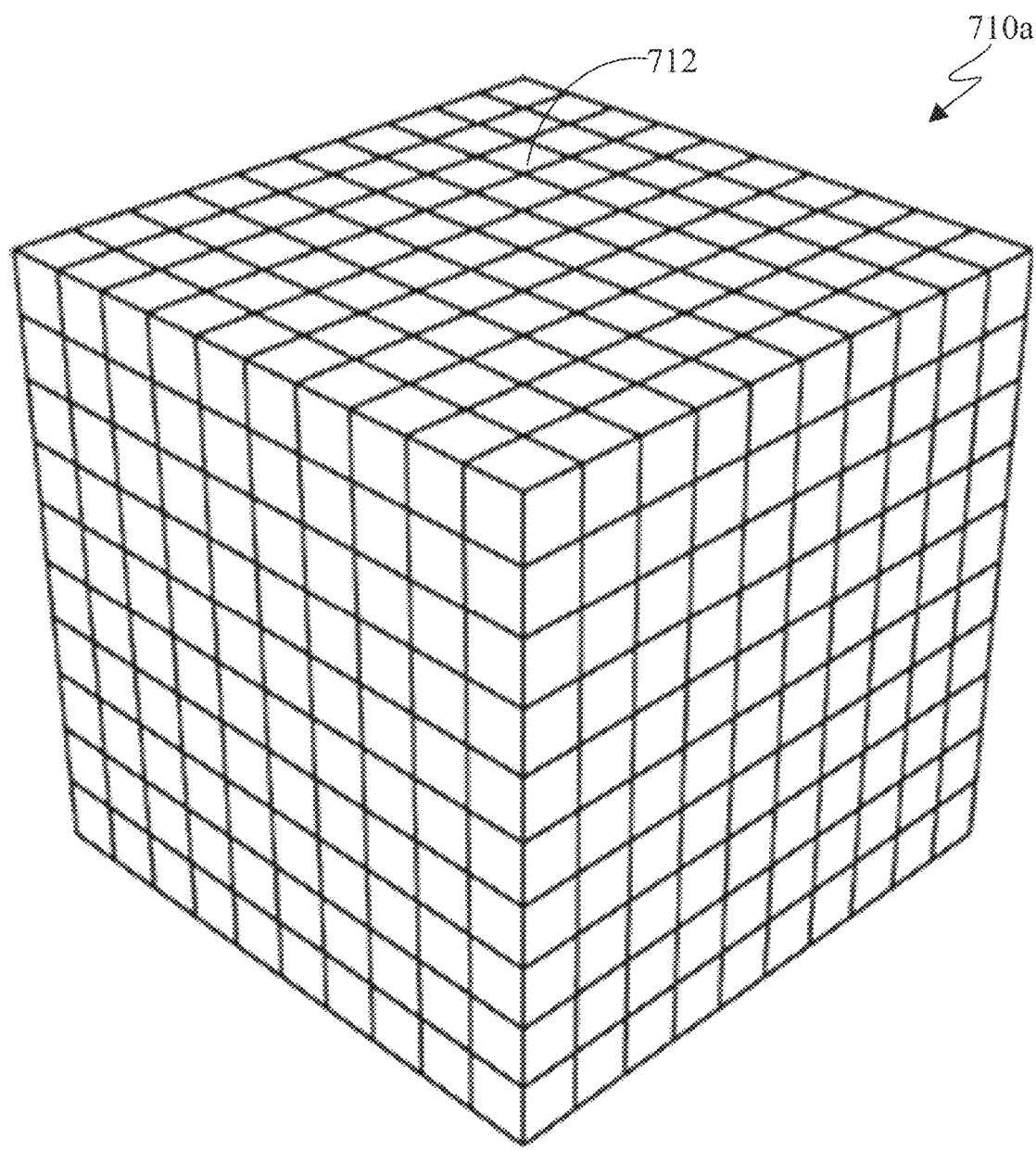
FIG. 7B illustrates an example grid and cells in accordance with an embodiment of this disclosure.
Figure 7C:
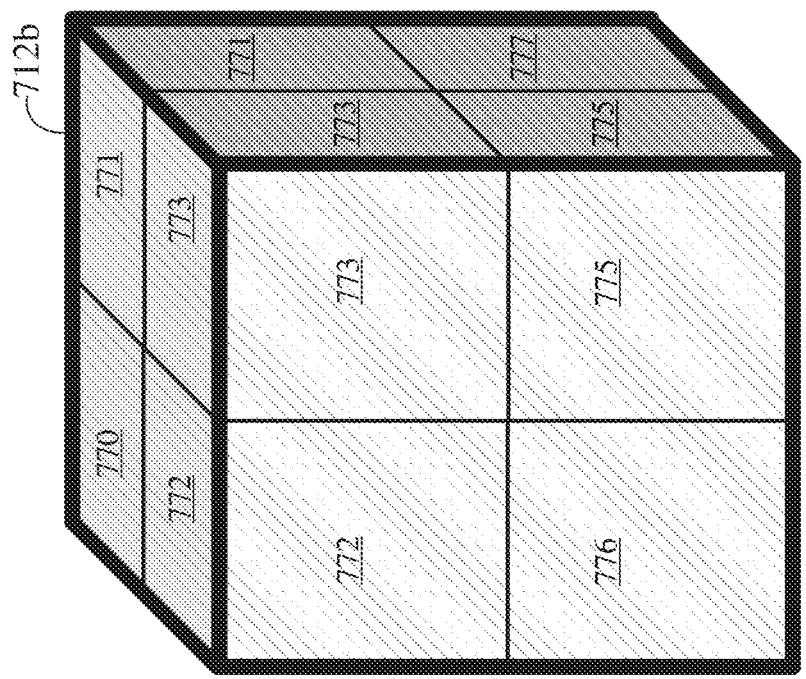
FIG. 7C illustrates example 3D cells of the grid of FIG. 7B in accordance with an embodiment of this disclosure.
Figure 7C:
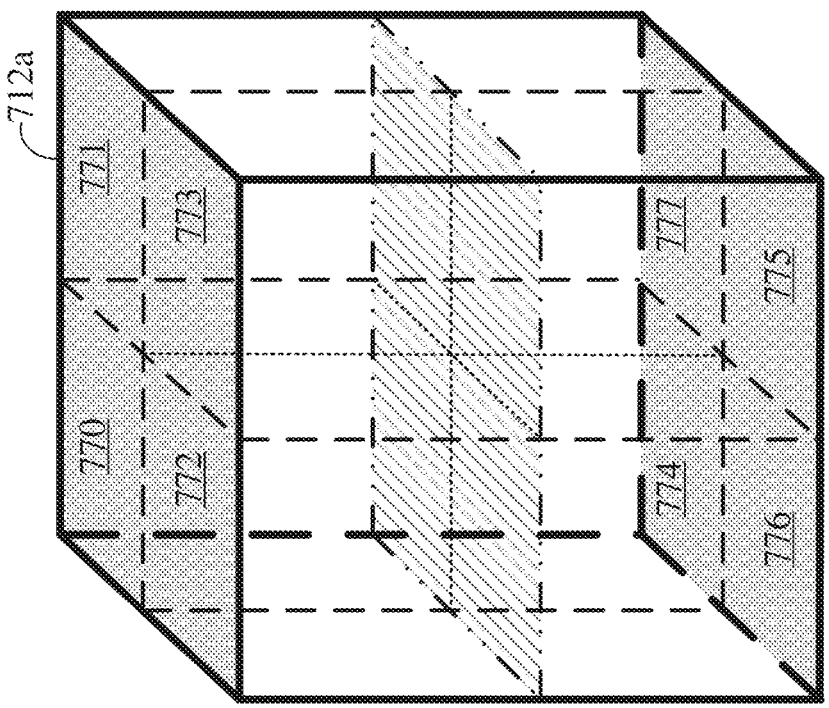

FIGS. 7A-7C describe the process for smoothing boundary points. FIG. 7A illustrates an example method 700 for selecting certain centroids that are used to perform smoothing in accordance with an embodiment of this disclosure. FIG. 7B illustrates an example grid 710a and cells in accordance with an embodiment of this disclosure. FIG. 7C illustrates an example 3D cells 726a of the grid 710a in accordance with an embodiment of this disclosure. The method 700 can be performed by the sever 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 700 is described as being performed by the decoder 550.

The decoder 550 reconstructs the point cloud 702 from the decoded frames, such as the decoded geometry frame 516a, the decoded occupancy map frame 518a, and the decoded texture frame 520a. The reconstructed point cloud 702 can be generated by the reconstruction engine 556 of FIG. 5C. For example, the reconstructed point cloud 702 is similar to the reconstructed point cloud 564 of FIG. 5C, without smoothing.

At step 710, the decoder 550 splits the reconstructed point cloud 702 into a 3D grid. The 3D grid is composed of multiple 3D cells. The shape and size of the cells can be uniform throughout the grid or change from cell to cell. For example, the grid 710a, as illustrated in FIG. 7B, is composed of multiple cells, such as the cell 712. As illustrated, the grid 710a is composed of 1,000 cells (10 cells in the height, 10 cells in width, and 10 cells length) of uniform size and shape. In other embodiments (not illustrated), any number of cells can be used, and the cells can be any shape. The grid 710a is sized, such that the reconstructed point cloud 702 is positioned within the grid 710a. As such, points of the reconstructed point cloud 702 are included in various cells of the grid 710a, while other cells of the grid remain empty.

In step 720, the decoder 550 identifies the boundary points of the reconstructed point cloud 702. The step 720 can be performed by the boundary detection engine 558 of FIG. 5C. To identify boundary points, the decoder 550 identifies the points within the reconstructed point cloud 702 that were represented as pixels that were positioned on a boundary of one of the patches within the geometry frames 516a or the texture frames 520a. In certain embodiments, the decoder 550 identifies the points within the reconstructed point cloud 702 that were represented as pixels that were positioned near a boundary of one of the patches within the geometry frames 516a or the texture frames 520a, based on the value of a corresponding pixels at the same location in the occupancy map frame 518a Correspondence exists between a pixel in the reconstructed occupancy map frames 518a and a point in the reconstructed 3D point cloud 702. That is, for each valid pixel in the reconstructed occupancy map frames 518a, there is a corresponding point of the reconstructed 3D point cloud 702. For example, when a pixel at location (u, v) of the reconstructed occupancy map frames 518a is valid, there is a corresponding pixel at the same (u, v) location in the reconstructed geometry frames 516a with the geometry data of a point of the reconstructed 3D point cloud 702. Based on the correspondence between a pixel in the pixel in the reconstructed occupancy map frames 518a and a point in the reconstructed 3D point cloud 702, the decoder 550 inspects the points of the reconstructed 3D point cloud 702 to identify each boundary point. A point of the reconstructed point cloud 702 is identified as a boundary point when (i) that point corresponds to a valid pixel in the reconstructed occupancy map frames 518a and (ii) that valid pixel of the reconstructed occupancy map frames 518a is within a predetermined distance to an invalid pixel in the same frame. The predetermined distance can be one or more pixels that separate the valid pixel of the reconstructed occupancy map frames 518a (which corresponds to a point of the point cloud) and an invalid pixel of the reconstructed occupancy map frames 518a.

In step 730, the decoder 550 identifies boundary cells that are associated with each identified boundary point (from step 720). There are two types of boundary cells. A first type of the of boundary cells includes a boundary point (as identified in step 720). The second type of boundary cells corresponds to a predefined number of cells that neighbor the first type of boundary cells (the cells that includes the boundary point). As such, in step 732 the decoder 550 identifies a cell that contains a boundary point (the first type of boundary cells). Then in step 734, the decoder 550 identifies a location of the boundary point within the cell in order to identify the neighboring cells in step 736.

For example, FIG. 7C illustrates example 3D cell 712a and 3D cell 712b. The 3D cell 712a and 3D cell 712b can represent the cell 712 from the grid of FIG. 7B. For example, the cell 712a illustrates the internal view of the cell 712 of FIG. 7B while the cell 712b illustrates the external view of the cell 712 of FIG. 7B. The cell 712a and 712b can be referred to as cell 712. A single cell, such as the cell 712 is divided into eight portions or sub-cells (upper left back, upper right back, lower left back, lower right back, upper left front, upper right front, lower left front, and lower right front) denoted as portion 770 through portion 777. One or more points of the 3D point cloud can be located throughout the internal structure of the cell 712. Any of the points that are located within the cell 712 can be boundary points as identified within the step 732.

When a boundary point is located within the cell 712, the cell 712 as well as seven neighboring cells of the cell 712 are denoted as a boundary cell. For example, when a boundary point is located within the portion 776 (the lower left front sub cell) of the cell 712, then the boundary cells would include the cell 712 and the seven cells that are closest to (neighbor) the portion 776. That is, for a boundary point located in the portion 776, the boundary cells would be the cell 712, as well as the cells that are positioned to the left, to the bottom, to the bottom left, to the front, to the front left, to the front bottom, to the left bottom front of the cell 712. Stated differently, the seven neighboring cells can include (i) the cell directly below the cell 712 (such as the cell that touches the portions 774, 775, 776, and 777), (ii) the cell directly in front of the cell 712 (such as the cell that touches the portions 772, 773, 775, and 776), (iii) the cell directly to the left of the cell 712 (such as the cell portions 770, 772, 774, and 776), (iv) the cell that is located in front and below of the cell 712 (such as the cell the portions 775 and 776), (v) the cell that is located to the left and below of the cell 712 (such as the cell the portions 774 and 776), (vi) the cell that is located in front and to the left of the cell 712 (such as the cell the portions 772 and 776), and (vii) the cell that touches the bottom left corner of the portion 776 of the cell 712.

Based on the location of the boundary point within the boundary cell, the decoder 550 in step 736, identifies a certain number of neighboring cells. The neighboring cells are the cells that touch another cells. It is noted that there are twenty-six cells that neighbor (touch) a single cell. As such, the second type of boundary cells are the cells which are closest to the boundary point that is within the identified cell of step 732 (the first type of boundary cell). It is noted that there are a predetermined number of cells that neighbor the cell that includes the boundary point. In certain embodiments, there are a total of 8 boundary cells for a single boundary point. For example, for a single boundary point there is the boundary cell to which that boundary point belongs and seven neighboring cells. The seven neighboring cells are selected from the possible twenty-six neighboring cells based on the location of the boundary point within the cell. That is, the seven closest neighboring cells to the boundary point are selected as boundary cells in addition to the cell that includes the boundary point itself. That is, depending on the location of the identified boundary point within a boundary cell, of the first type, there are only a certain number of neighboring cells of the second type which are used for smoothing.

Syntax (1), below, describes the process of identifying a boundary cell, of step 730. The following variables are used as inputs to Syntax (1) for identifying the boundary cells, numCells1D, pointCnt, recPcGeo, isBoundaryPoint, current point position (pointGeom[k], k=0 to 2, inclusive), and array containing boolean flags (cellDoSmoothing[x][y][z]) for all x, y, and z=0 to numCells1D−1, inclusive. A boolean value denoted as otherClusterPtCnt, is one of the outputs of Syntax (1). Syntax (1) also outputs an array that array containing the top-left corner of 2×2×2 grid, s[i], i=0 to 2, inclusive. The array t[i], with i=0 to 2, inclusive, which contains the 2×2×2 grid positions associated with the current position.

```
Syntax                                                    (1)
for( k = 0; k < 3 ; k++ ) {
    idxCell[ k ] = ( recPos3D[ k ] / gridSize )
    cellAnchor[ k ] = idxCell[ k ] + ( ( ( recPos3D[ k ] % gridSize ) < (
gridSize / 2 ) ) ? −1 : 0 )
    }
currentCell1DIdx = cellIdxLut[ idxCell[ 0 ] ][ idxCell[ 1 ] ][ idxCell[ 2 ] ]
otherClusterPtCnt = 0
for( dx = 0; dx < 2; dx++ ) {
    for( dy = 0; dy < 2; dy++ ) {
        for( dz = 0; dz < 2; dz++ ) {
            xIdx = cellAnchor[ 0 ] + dx
            yIdx = cellAnchor[ 1 ] + dy
            zIdx = cellAnchor[ 2 ] + dz
            tmpIdx = cellIdxLut[ xIdx ][ yIdx ][ zIdx ]
            idxArr[ dx ][ dy ][ dz ] = tmpIdx
            if( cellDoSmoothing[ tmpIdx ] && cellCnt[ tmpIdx ] )
                otherClusterPtCnt = 1
        }
    }
}
```

Figure 8A:
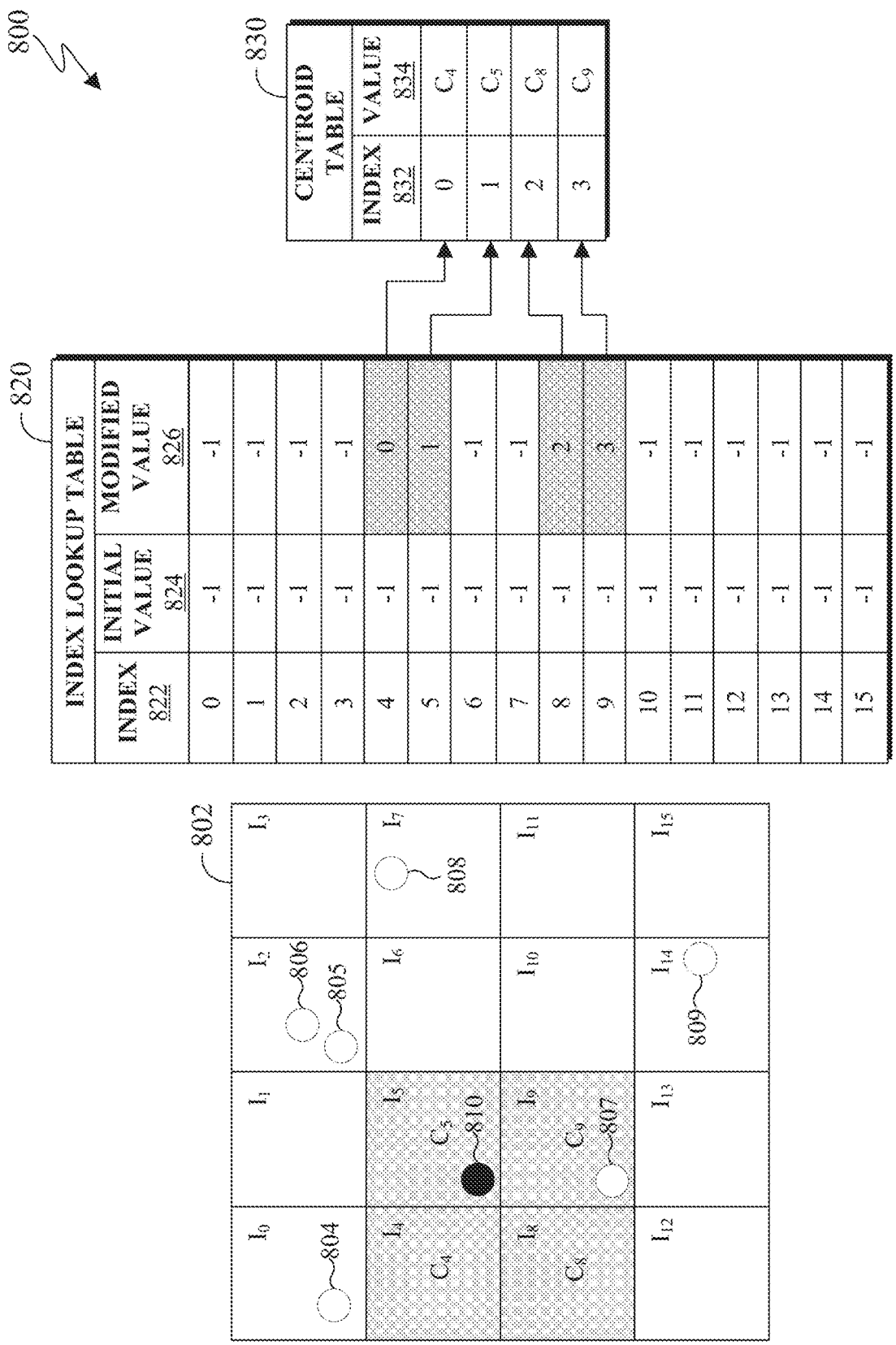
FIG. 8A illustrates an 2D example for identifying selecting certain centroids that are used to perform smoothing in accordance with an embodiment of this disclosure.
Figure 8B:
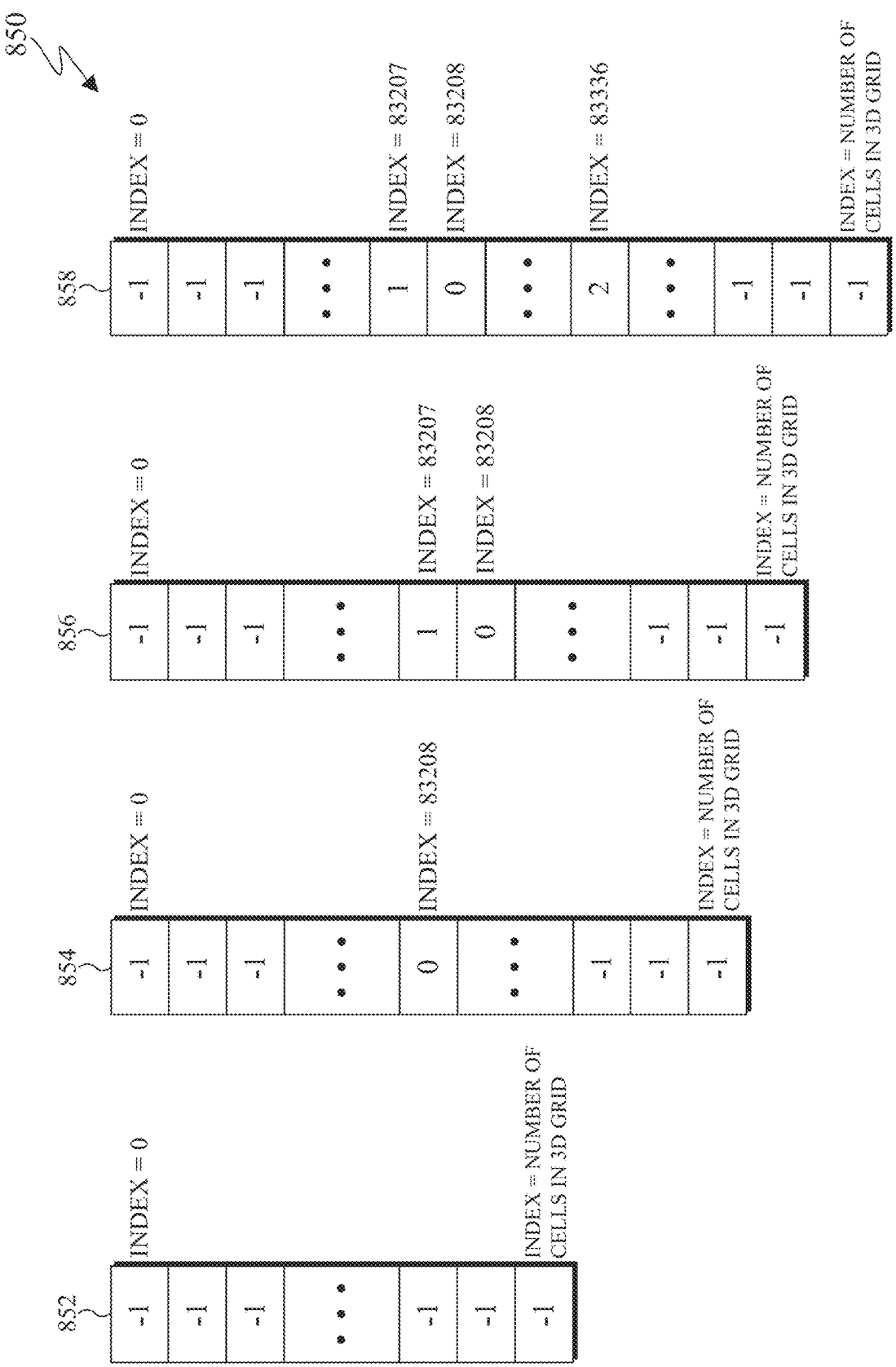
FIG. 8B illustrates a 3D example for identifying selecting certain centroids that are used to perform smoothing in accordance with an embodiment of this disclosure.

After the boundary cells are identified, the decoder 550 generates a look up table (step 740). The look up table relates the identified boundary cells to the an index that represents cells associated with the reconstructed 3D point cloud. FIGS. 8A and 8B, discussed in greater details below, illustrate examples of generating the look up tables relating the cell index to the boundary cells.

Syntax (2) describes the generation of the index lookup table. As used in Syntax (2), the expressions numCells1D, gridSize, and pointCnt, and recPcGeo[n][k] are the inputs. The expression numCells1D is the number of cells in x, y, or z direction. The expression gridSize is the size of the cell in x, y, or z direction. The expression pointCnt is the number of reconstructed points. It is noted that recPcGeo[n][k], n=0 and PointCnt-1, k=0 . . . 2.

Syntax (2) generates an array cell called cellIdxLut[x][y][z], 0<x, y, z<numCells1D. Syntax (2) also generates an expression numBoundaryCells, which is the number of cells relevant for grid geometry or attribute smoothing. It is noted that all of the cells in the grid 710a of FIG. 7B may not be relevant to performing geometry smoothing or attribute smoothing. Therefore, the decoder 550 generates a lookup table from 3D cell index into a smaller 1D cell structure which stores the boundary cells, since the boundary cells are the only cells that are relevant to grid geometry smoothing or attribute smoothing. An array cellIdxLut of size numCells×numCells×numCells is initialized to −1 and a variable numBoundaryCells is initialized to 0.

```
Syntax                                                              (2)
disth = Max( gridSize / 2, 1 );
th = gridSize * numCells1D;
for( n = 0; n < PointCnt; n++ ) {
    if( IsBoundaryPoint[ n ] == 1 ) {
        x = RecPcGeo[ n ][ 0 ]
        y = RecPcGeo[ n ][ 1 ]
        z = RecPcGeo[ n ][ 2 ]
        if( x < disth || y < disth || z < disth || th <= x + disth || th <=
y + disth || th <= z + disth )
            continue
        x2 = x / gridSize
        y2 = y / gridSize
        z2 = z / gridSize
        x3 = x % gridSize
        y3 = y % gridSize
        z3 = z % gridSize
        qx = x2 + ( ( x3 < gridSize / 2 ) ? -1 : 0
        qy = y2 + ( ( y3 < gridSize / 2 ) ? -1 : 0
        qz = z2 + ( ( z3 < gridSize / 2 ) ? -1 : 0
        for( ix = qx; ix < qx + 2; ix++ ) {
            for( iy = qy; iy < qy + 2; iy++ )
                for( iz = qz; iz < qz + 2; iz++ ) {
                    cellId = ix + iy * numCells1D + iz *
numCells1D * numCells1D
                    if( cellIdxLut[ cellId ] == -1 ) {
                        cellIdxLut[ cellId ] =
                        numBoundaryCells;
                        numBoundaryCells++
                    }
                }
        }
    }
}
```

In step 750, the decoder identifies the centroid of each of the boundary cells. The centroid can be a geometry centroid when the smoothing engine 560 of FIG. 5C preforms the geometry smoothing. The centroid can be a color centroid when the smoothing engine 560 of FIG. 5C preforms the texture (color) smoothing. Syntax (3)-Syntax (6), as described below, discuss the identification of the geometry center grid which corresponds to the geometry centroid. Syntax (6)-Syntax (9) as described below, discuss the identification of the color center grid which corresponds to the color centroid.

To identify the geometry center grid, the expressions gridSize and pointCnt are inputs. The expression gridSize is the geometry smoothing grid size and pointCnt is the number of points in the current reconstructed point cloud frame. For example, the three-dimensional geometry coordinate space is divided into cells of size gridSize×gridSize×gridSize.

The expression isBoundaryPoint[n], n=0 . . . pointCnt-1, is also an input and indicates whether the n-th reconstructed point lies on or near a patch boundary. Similarly, recPcGeo[i][k], i=0 . . . pointCnt-1, k=0 . . . 2, is another input that describes an array containing the reconstructed point positions. Another array denoted by the expression, pointToPatch[n], n=0 . . . pointCnt-1, includes the index of the patch that the n-th reconstructed point, recPcGeo[n], belongs to.

To identify the geometry center grid, the decoder 550 identifies the output numCells1D, which is the number of cells in x, y, or z direction. The 3D geometry coordinate space is divided into cells that are a size based on the expression gridSize, defined above. Syntax (3) below describes the process of identifying the expression numCells1D which is number of cells in x, y, or z direction.

```
Syntax                                                              (3)
for( k = 0; k < 3; k++ ) {
    maxG[ k ] = recPcGeo[ 0 ][ k ]
}
for( i = 1; i < pointCnt ; i++ )
    for( k= 0; k < 3 ; k++ ) {
        maxG[ k ] = Max(maxG[ k ], recPcGeo[ i ][ k ] )
    }
numCells1D = ( Max( maxG[ 0 ], Max( maxG[ 1 ], maxG[ 2 ] ) ) +
gridSize - 1 ) / gridSize
```

Additionally, to identify the geometry center grid, the decoder 550 also identifies the output numBoundaryCells, which is the number of cells containing a boundary point or neighboring such a cell. The expression cellIdxLut[x][y][z], for x, y, and z in the range of 0 to numCells1D-1, inclusive, is an output of an array mapping a 3-D cell index to a 1-D index in the range of 0 . . . numBoundaryCells-1. The expression cellCnt[n], n=0 . . . numBoundaryCells-1, is an array containing number of reconstructed points in cells. The expression cellDoSmoothing[n], n=0 . . . numBoundaryCells-1, is a boolean array indicating whether smoothing should be performed for a cell.

To generate the index look up table, the decoder 550 uses expressions numCells1D, gridSize, pointCnt, isBoundaryPoint[n], and recPcGeo[i][k] as the inputs while the array cellIdxLut[x][y][z], and numBoundaryCells are the outputs. The arrays cellDoSmoothing[n], cellCnt[n], cellPatchIdx[n], and centerGrid[n][k] are initialized to 0 for all x, y, and z in the range of 0 to (numBoundaryCells-1), inclusive, and k in the range of 0 to 2, inclusive. Syntax (4), is applied for n=0 and pointCnt-1.

$x$Idx=recPcGeo[$n$][0]/gridSize $y$Idx=recPcGeo[$n$][1]/gridSize $z$Idx=recPcGeo[$n$][2]/gridSize cellIndex=cellIdxLut[$x$Idx+$y$Idx*numCells1$D$+
    $z$Idx*numCells1$D$*numCells1$D$]     Syntax (4)

When cellIndex is not equal to −1, the following applies. If cellCnt[cellIndex] is equal to 0, cellPatchIdx[cellIndex] is set to the patch index of the patch that the current reconstruction point, recPcGeo[n], belongs to. Otherwise, if cellDoSmoothing[cellIndex] is equal to 0 and cellPatchIdx[cellIndex] is not equal to the index of the patch that the current point, recPcGeom[n], belongs to, cellDoSmoothing[cellIndex] is set to 1. For example, Syntax (5) is applied to generate the geometry grid when cellIndex is not equal to −1. Syntax (6) is used to identify the centroid for each cell with a non-zero count.

for($k$=0;$k$<3;$k$++)

centerGrid[cellIndex][$k$]+=recPcGeom[$n$][$k$]cellCnt
    [cellIndex]++     Syntax (5)

if(cellCnt[$n$]>0)

for($k$=0;$k$<3;$k$++)

centerGrid[$n$][$k$]=centerGrid[$n$][$k$]+cellCnt[$n$]   Syntax (6)

To identify the attribute center grid the inputs to the process are as follows. A first input is the expression numComps which indicates the number of attribute components. A second input is the attribute index denoted as aIdx. The inputs also include an array of the reconstructed positions, RecPcGeom[i], with i in the range of 0 to PointCnt−1, inclusive. Another input an array that includes the reconstructed attributes, RecPcAttr[aIdx][i], with i in the range of 0 to PointCnt−1, inclusive.

The outputs of the process include an array containing reconstructed center grid attribute values, attCenterGrid[i][k], with i in the range of 0 to numCells1D−1, inclusive, and k in the range of 0 to numComps−1, inclusive. The outputs also include an array containing reconstructed center grid mean luma values, meanLuma[k], with k in the range of 0 to numComps−1, inclusive and an array containing reconstructed center grid luma median values, attrMean[i][k] with i in the range of 0 to numCells1D−1, inclusive, and k in the range of 0 to numComps−1, inclusive.

To identify the attribute center grid, the elements of the arrays attrCenterGrid[x][y][z][m] and meanLuma[x][y][z] are initialized to 0 for all x, y, and z in the range of 0 to numCells1D−1, inclusive and m in the range of 0 to numComps−1, inclusive. For i=0, PointCnt−1, Syntax (7) describes the process of identifying the variables xIdx, yIdx, and zIdx.

xIdx=(RecPcGeom[$i$][0]/GridSize)

yIdx=(RecPcGeom[$i$][1]/GridSize)

zIdx=(RecPcGeom[$i$][2]/GridSize)   Syntax (7)

If cellDoSmoothing[xIdx][yIdx][zIdx] is equal to 1, Syntax (8) is applied. If cellCnt[x][y][z] is greater than 0 for x, y, and z in the range of 0 to numCells1D−1, inclusive, the mean and median luma values of attribute with index aIdx, for points belonging to that cell are identified For Example, the expression meanLuma[xIdx][yIdx][zIdx]+=RecPcAttr[aIdx] [i][0]. Syntax (9) describes the decoder 550 identifying the attribute center grid.

for($k$=0;$k$<numComps;$k$++)

attrCenterGrid[$x$Idx][$y$Idx][$z$Idx][$k$]+=RecPcAttr
   [aIdx][$i$][$k$];   Syntax (8)

for($k$=0;$k$<numComps;$k$++)

attrCenterGrid[$x$Idx][$y$Idx][$z$Idx][$k$]= attrCenterGrid[$x$Idx][$y$Idx][$z$Idx][$k$](cellCnt[$x$Idx]
   [$y$Idx][$z$Idx]meanLuma[$x$Idx][$y$Idx][$z$Idx]
   =meanLuma[$x$Idx][$y$Idx][$z$Idx](cellCnt[$x$Idx]
   [$y$Idx][$z$Idx]   Syntax (9)

After the centroid for the boundary cells are identified, in step 560a, the decoder 550 performs the smoothing. In certain embodiments, the decoder 550 performs the geometry smoothing and then performs the color smoothing.

Although FIGS. 7A-7C illustrates one example of performing attribute smoothing, various changes can be made to FIGS. 7A-7C. For example, while shown as a series of steps, various steps in the method 700 of FIG. 7A could overlap, occur in parallel, or occur any number of times.

FIG. 8A illustrates an example 800 in 2D for identifying selecting certain centroids that are used to perform smoothing in accordance with an embodiment of this disclosure. FIG. 8B illustrates an example 850 in 3D for identifying selecting certain centroids that are used to perform smoothing in accordance with an embodiment of this disclosure. The examples 800 and 850 can be performed by the sever 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the methods 800 and 850 are described as being performed by the decoder 550.

The example 800 of FIG. 8A, describes using only two dimensions of a 3D grid for identifying the boundary cells while generating the centroid table. Generally, first the point cloud is split into the 3D grid. The grid 802 is a 2D grid, but concept can be expanded for a 3D grid. For a 3D grid, cells that contain a boundary point and their seven neighboring cells are identified. The indices of the boundary cells are stored in an index lookup table, while the centroid of the boundary cells are stored in a centroid table. The size of the index lookup table includes all of the cells while the size of the centroid look up table is equal to the number of boundary cells. The index lookup table is used to map the 3D indices of the boundary cell to a 1D indices of a centroid table.

As illustrated in the example, 800, the 2D grid 802 includes points 804, 805, 806, 807, 808, 809, and 810 that are positioned throughout a 2D grid 802. Each of the points 804, 805, 806, 807, 808, 809, and 810 have an (x, y) location. It is noted, the point 810 is a boundary point, since the point 810, when corresponds to a pixel the occupancy map frame that is valid and adjacent to another pixel that is not valid. The index lookup table 820 includes three columns the index 822, initial value 824, and the modified value 826. Each row of the index 822 corresponds to a particular cell. For example, the index 0 of corresponds to the cell $I_0$, which includes the point 804. For another example, the index 5 the corresponds to the cell $I_5$, which includes the boundary point 810. After identifying the boundary point, the neighboring boundary cells $I_4$, $I_8$ and $I_9$ are identified. The cell $I_4$ is identified as a boundary cell since the boundary point 810 is located on the left side of the cell $I_5$. The cell $I_9$ is identified as a boundary cell since the boundary point 810 is located on the on the bottom side of the cell $I_5$. The cell $I_8$ is identified as a boundary cell since the boundary point 810 is located on the on the bottom left corner of the cell $I_5$. It is noted that even though the cells $I_0$, $I_1$, $I_2$, $I_6$, and $I_{10}$ are adjacent to and touch the cell $I_5$, which contains the boundary point 810, the cells $I_0$, $I_1$, $I_2$, $I_6$, and $I_{10}$ are not identified as a boundary cell, since the boundary point 810 is located closer to the cell $I_4$, $I_8$, and $I_9$, than the cells $I_0$, $I_1$, $I_2$, $I_6$, and $I_{10}$.

As illustrated the index lookup table 820 has the same number of entries as the number of cells in the grid 802. As illustrated, there are 16 cells within the grid 802 (cells $I_0$ through $I_{15}$) and there are 16 rows of the index lookup table 820, where each row of the index lookup table 820 corresponds to a particular cell of the grid 802. For example, index 0 of the index 822 corresponds to the cell $I_0$. The initial value 824 column if the index lookup table 820 is set to −1 for each cell. For each boundary cell, the modified value 826 increases by one.

For example, for the cell $I_4$, the value increase from −1 to 0. For the cell $I_5$, the value increase from 0 to 1. For the cell $I_8$, the value increase from 1 to 2. For the cell $I_5$, the value increase from 0 to 1. For the cell $I_9$, the value increase from 2 to 3. These modified values correspond to the index 832 of the centroid table 830. The centroid table 830 relates the identified boundary cells to their corresponding centroid. For example, the decoder 550 first identifies the boundary cells, and then derives the centroid value for the identified boundary cells. As such, there is a correspondence that is created between the index 822 and the value 834 based on the modified value 826. After the centroids are identified, the decoder 550 can determine whether to perform smoothing to the boundary point 810. For example, the decoder 550 can compare the centroid of the cells $I_4$, $I_8$, and $I_9$ to the centroid of the cell $I_5$. If smoothing is to be performed, the decoder 550 can perform a trilinear filter to the centroids of the cells $I_4$, $I_8$, and $I_9$ and replace the boundary point 810 with the value of the output of the trilinear filter.

The following parameters are used for the example 850 of FIG. 8B. For the example 850 of FIG. 8B, the point cloud dimension is 1024*1024*1024. The grid is composed of uniform cells that are 8*8*8. As such, based on the size of the point cloud, and the size of each cell, there could be 2,097,152 cells (since 128*128*128) within the grid. At first, the look up table 852 is initialized to −1. That is, the cell index values, from index 0 to the maximum number of cells in the grid, are initialized to the value of −1.

The decoder 550 identifies a boundary point that is located at (66, 87, 46). The identified boundary point would be located in the cell (8, 10, 5) since (int[66/8], int[87/8], int[46/8]), due to the fact that each cell is at a are 8*8*8 size. The decoder then identifies that that boundary point is located in the lower front left portion of the cell since 66%8=2<4, 87%8=7>4, 46%8=5>4. As such the seven neighboring cells would be: (i) the cell to the left (7, 10, 5), (ii) the cell to the bottom (8, 11, 5), (iii) the cell to the bottom left (7, 11, 5), (iv) the cell to the front (8, 10, 6), (v) the cell to the front left (7, 10, 6), (vi) the cell to the bottom (8, 11, 6), (vii) the cell to the left bottom (7, 11, 6). The decoder 550 then converts the 3D indices of the cells to a one-dimensional (1D) index. Equation (3) describes a process for converting the 3D index (denoted by an X, Y, Z coordinate) to a 1D index. For a cell located at (ix, iy, iz), the 1D index is denoted as CellId.

$$\text{CellId}=ix+(iy*\text{numCells1D})+(iz*\text{numCells1D}*\text{numcells1D}) \quad \text{Equation (3)}$$

The expression numCells1D is based on the size of the cells. In this example, the expression numCells1D is 128. As such, the cell 1D for the cell that includes the boundary point is 83208 since (8+(10*128)+(5*128*128)=83208. Similarly, the 1D indices of the boundary cells would be 83208, 83207, 83336, 83335, 99592, 99591, 99720, and 99719, respectively.

The expression numBoundaryCell is increased by an integer of one for each subsequent boundary cell. For example, the look up table 854 illustrates that the look up table after setting the first boundary cell, denoted by index 83208, index to 0, thereafter the numBoundaryCell is set to 1. The look up table 856 illustrates the look up table after setting the second boundary cell, denoted by index 83207, to 1, thereafter numBoundaryCell is set to 2. The lookup table 858 illustrates the lookup table after setting the third boundary cell, denoted by index 83336, to 2, thereafter numBoundaryCell is set to 3. The process continues to set the value in the lookup table for each boundary cell, based on the value of the expression numBoundaryCell, which increases for each subsequent boundary cell.

After all of the index values of the boundary cells are modified, the decoder 550 identifies the centroid values of each of the cells whose index is not equal to −1. The centroid value of each cell is then stored in the centroid table, similar to the centroid table 830 of FIG. 8A. In certain embodiments, the centroid could be a geometry centroid, which is stored in a geometry centroid table or an attribute centroid (such as color or texture) and stored in a corresponding attribute table.

Although FIGS. 8A and 8B illustrates examples of generating the lookup tables, various changes can be made to FIGS. 8A and 8B. For example, any number of boundary points can be included in the cells.

Figure 9:
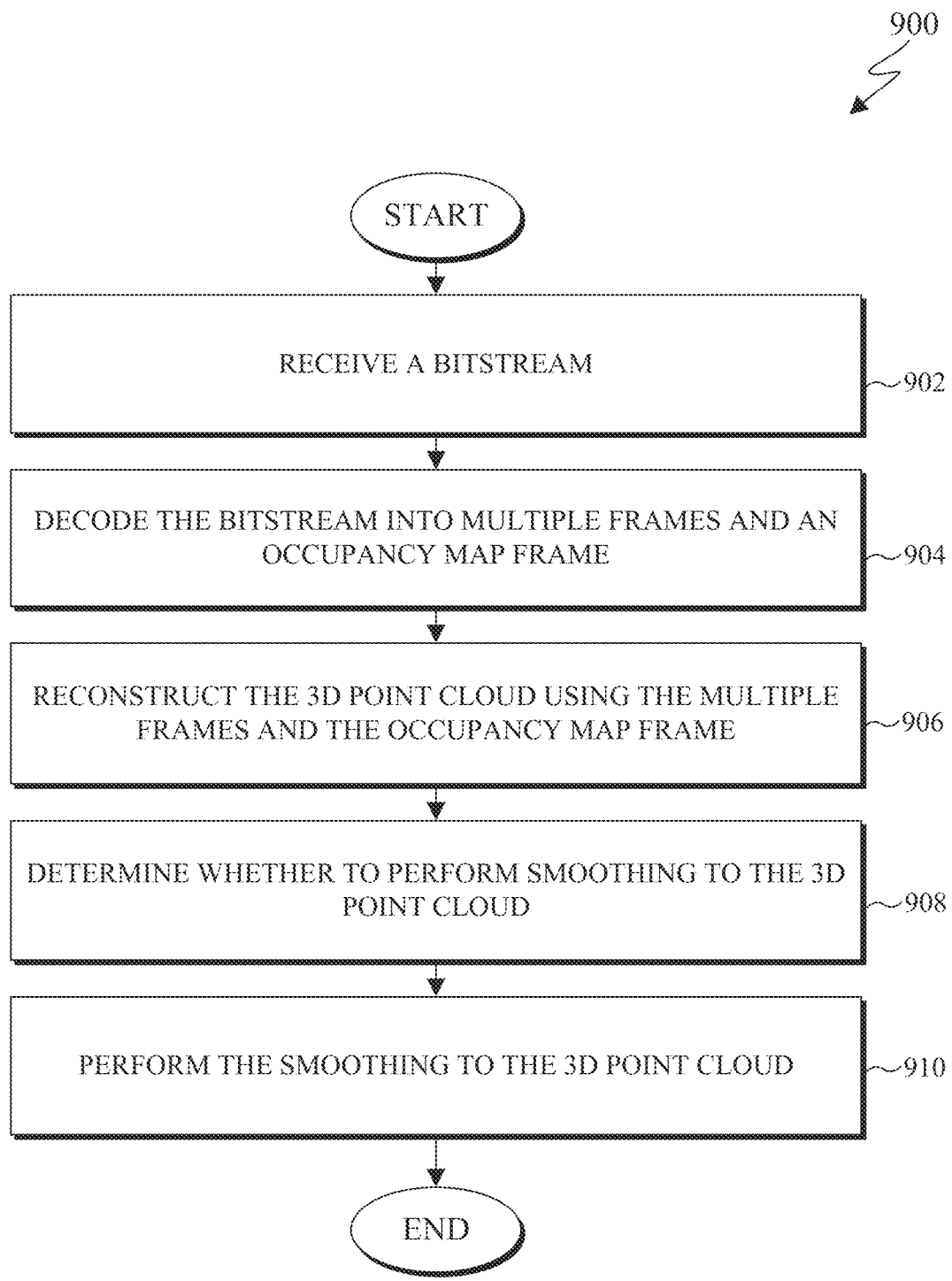
FIG. 9 illustrates example method for decoding a point cloud in accordance with an embodiment of this disclosure.

FIG. 9 illustrates example method for decoding a point cloud in accordance with an embodiment of this disclosure. The method 900 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 900 is described as being performed by the decoder 550 of FIGS. 5A and 5C.

The method 900 begins with the decoder, such as decoder 550, receiving a compressed bitstream (step 902). The received bitstream can include an encoded point cloud that was mapped onto multiple 2-D frames, compressed, and then transmitted and ultimately received by the decoder 550.

In step 904, the decoder 550 decodes multiple frames from the bitstream. The multiple frames are composed of pixels. In certain embodiments, a portion of the pixels within a frame are organized into patches that correspond to clusters of points of the 3D point cloud. The frames can include at least one geometry frame, and at least one attribute frame. For example, the geometry frame includes pixels and a portion of the pixels of the geometry frame represent geometric locations of points of the 3D point cloud. The pixels of the geometry frame that are organized into patches corresponding to respective clusters of the points of the 3D point cloud. Similarly, the attribute frame includes pixels and a portion of the pixels of the attribute frame represent attribute information of the points of the 3D point cloud, and a position of the pixels in the attribute frame correspond to a respective position of the pixels in the geometry frame.

The decoder 550 also decodes an occupancy map from the bitstream. The occupancy map indicates the portion of the pixels that are included in the multiple frames that represent points of the 3D point cloud. For example, the occupancy map frame includes pixels that identify the portion of the pixels in the geometry frame that represent the geometric locations of the points of the 3D point cloud. That is, the value of for a pixel at location (x, y) in the occupancy map frame, indicates whether a pixel at the same (x, y) location in one of the multiple frames is represents a point of the point cloud or is empty.

In step 906, the decoder 550 reconstructs the 3D point cloud. In certain embodiments, the decoder 550 reconstructs the 3D point cloud using the multiple frames and the occupancy map frame.

In step 908, the decoder 550 determines whether to perform smoothing to the 3D point cloud based at least in part on the properties of the multiple frames. For example, the properties can indicate the attribute type, the number of components, and a flag (or syntax element), which indicates whether attribute smoothing is enabled. The flag (or syntax element) can be included in the bitstream. For instance, the attribute type can indicate whether the attribute frame is in an RGB 444 format. For another example, the properties can include whether the attribute frame is in an YUV 420 format.

Based on a determination to perform smoothing, the decoder 550 performs smoothing to the 3D point cloud (step 910). For example, when the smoothing is attribute smoothing, and one of the multiple frames is an attribute frame with an RGB 444 format, the decoder 550 determines to perform the smoothing based on the values associated with the G component of the RGB frame.

For another example, when the smoothing is attribute smoothing, and one of the multiple frames is an attribute frame with an YUV 420 format, when the decoder 550 determines to perform the smoothing, the decoder 550 first upscales the frame to a YUV 444 format. Once the frame is in a YUV 444 format, the decoder 550 performs the attribute smoothing based on the values associated with Y of the YUV frame. Once the smoothing is performed, the decoder 550 converts the YUV 440 format frame to an RGB 444 format.

In order to perform the smoothing, the decoder 550 generates a grid that includes multiple cells. The constructed point cloud is positioned within the grid, such that various points are located in different cells. The decoder 550 identifies boundary points of the 3D point cloud based on the multiple frames and the occupancy map. In certain embodiments, to identify the boundary point, the decoder 550 first identifies a first pixel in the occupancy map frame whose value indicates that the first pixel is valid and adjacent to a second pixel whose value indicates that the second pixel is invalid. The first pixel can be denoted as a boundary pixel. After identifying the boundary pixel, the decoder 550 identifies a point in the 3D point cloud that corresponds to the first pixel.

After identifying the boundary points of the 3D point cloud, the decoder 550 identifies boundary cells that are associated with each boundary point. It is noted that a boundary cell can include a boundary point or neighbor a cell that contains a boundary point. A certain number of the boundary cells that neighbors a cell that contains a boundary point, are identified based on the location of the boundary point within a cell. For example, the decoder 550 can identify a region in a first cell that includes a boundary point. The decoder then identifies a predetermined number of neighboring cells that are adjacent to the region of the first cell. The first cell and the predetermined number of neighboring cells are denoted as boundary cells.

The decoder 550 derives the centroid for each identified boundary cells. Smoothing is performed, for a boundary point based on the identified centroids of the boundary cells that are associated with that particular boundary point.

The decoder 550 generates a first lookup table that lists the 3D cells. In certain embodiments, the first lookup table includes predefined entries for the plurality of 3D cells. After identifying the boundary cells, the decoder 550 generates a second lookup table that includes the centroid values of the boundary cells. The decoder 550 modifies the predetermined entry values of the boundary cells that are included in the first lookup table to generate a correspondence between the boundary cells of the first lookup table and the boundary cells of the second lookup table. The size of the first lookup table can be based on the number of 3D cells within the generated grid while the size of the second lookup table is based on the number of identified boundary cells which are associated with the boundary points.

Although FIG. 9 illustrates one example of a method 900 for decoding a point cloud, various changes may be made to FIG. 9. For example, while shown as a series of steps, various steps in FIG. 9 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
 a communication interface configured to receive a bitstream; and
 a processor operably coupled to the communication interface, wherein the processor is configured to:
  decode the bitstream into multiple frames that include pixels, the multiple frames including an attribute frame and a geometry frame, wherein a portion of the pixels are organized into patches and correspond to respective clusters of points of a three-dimensional (3D) point cloud,
  decode, from the bitstream, an occupancy map frame that indicates the portion of the pixels included in the multiple frames that represent the points of the 3D point cloud,
  reconstruct the 3D point cloud using the multiple frames and the occupancy map frame,
  determine whether to perform smoothing to the 3D point cloud based at least in part on properties of the multiple frames, and
  based on a determination to perform the smoothing, perform the smoothing to the 3D point cloud, and
 wherein the smoothing is attribute smoothing and the processor is further configured to:
  determine a format of the attribute frame,
  in response to a determination that the attribute frame is a Red, Green Blue (RGB) 444 format, perform the attribute smoothing based on values associated with zeroth component of the RGB 444 format, and
  in response a determination that the attribute frame is a YUV 420 format:
   up scale the attribute frame to YUV 444 format,
   perform the attribute smoothing based on values associated with zeroth component of the YUV 444 format, and
   after the attribute smoothing is performed, convert the YUV 444 format of the attribute frame to an RGB 444 format.

2. The decoding device of claim 1, wherein:
 the properties indicate an attribute type that is associated with at least one of the multiple frames and a quantity of components associated with the attribute type; and
 the processor is configured to perform the attribute smoothing when:
  the attribute type is Texture,
  the quantity is one or three color components, and
  a syntax element indicating that the attribute smoothing is enabled is identified from the bitstream.

3. The decoding device of claim 1, wherein the processor is further configured to:

generate a grid that includes a plurality of 3D cells, wherein the 3D point cloud is within the grid;
identify boundary points of the 3D point cloud based on the multiple frames and the occupancy map frame;
identify boundary cells, from the plurality of 3D cells, that are associated with the boundary points;
derive a centroid values for the boundary cells; and
perform the smoothing with respect to the boundary points, based on the centroid values of the boundary cells.

4. The decoding device of claim 3, wherein to identify one of the boundary points the processor is further configured to:
identify a first pixel of the occupancy map frame that is valid and adjacent to a second pixel that is invalid; and
identify a first point of the 3D point cloud, as a boundary point, when then first point is based on a pixel in one of the multiple frames that shares a location as the first pixel in the occupancy map frame,
wherein validity and invalidity of the first and second pixels included in the occupancy map frame is based on respective values of the pixels.

5. The decoding device of claim 3, wherein to identify the boundary cells the processor is further configured to:
identify a first cell, of the plurality of 3D cells, that includes a boundary point of the boundary points;
identify a region within the first cell that the boundary point is located;
identify a predetermined number of neighboring cells that are adjacent to the first cell and closest to the region within the first cell that the boundary point is located; and
identify the first cell and the neighboring cells as the boundary cells that that are associated with the boundary point.

6. The decoding device of claim 3, wherein the processor is further configured to:
generate a first lookup table that lists the plurality of 3D cells and includes a predetermined entry value for the plurality of 3D cells; and
after identifying the boundary cells, generate a second lookup table that includes the centroid values for the boundary cells.

7. The decoding device of claim 6, wherein the processor is further configured to modify the predetermined entry value of the boundary cells that are included in the first lookup table to generate a correspondence between the boundary cells the first lookup table and the boundary cells of the second lookup table, respectively.

8. The decoding device of claim 6, wherein:
a size of the first lookup table is based on a number of 3D cells of the grid, and
a size of the second lookup table is based on a number of boundary cells that are associated with any of the identified boundary points.

9. A method for point cloud decoding, the method comprising:
receiving a bitstream;
decoding the bitstream into multiple frames that include pixels, the multiple frames including an attribute frame and a geometry frame, wherein a portion of the pixels are organized into patches and correspond to respective clusters of points of a three-dimensional (3D) point cloud;
decoding, from the bitstream, an occupancy map frame that indicates the portion of the pixels included in the multiple frames that represent the points of the 3D point cloud;
reconstructing the 3D point cloud using the multiple frames and the occupancy map frame;
determining whether to perform smoothing to the 3D point cloud based at least in part on properties of the multiple frames; and
based on determining to perform the smoothing, performing the smoothing to the 3D point cloud and
wherein the smoothing is attribute smoothing and the method further comprises:
determining a format of the attribute frame,
in response to determining that the attribute frame is a Red, Green Blue (RGB) 444 format, performing the attribute smoothing based on values associated with zeroth component of the RGB 444 format, and
in response determining that the attribute frame is a YUV 420 format, performing the attribute smoothing comprises:
up scaling the attribute frame to YUV 444 format,
performing the attribute smoothing based on values associated with zeroth component of the YUV 444 format, and
after the attribute smoothing is performed, converting the YUV 444 format of the attribute frame to an RGB 444 format.

10. The method of claim 9, wherein:
the properties indicate an attribute type that is associated with at least one of the multiple frames and a quantity of components associated with the attribute type; and
the method further comprises performing the attribute smoothing when:
the attribute type is Texture,
the quantity is one or three color components, and
a syntax element indicating that the attribute smoothing is enabled is identified from the bitstream.

11. The method of claim 9, further comprises:
generating a grid that includes a plurality of 3D cells, wherein the 3D point cloud is within the grid;
identifying boundary points of the 3D point cloud based on the multiple frames and the occupancy map frame;
identifying boundary cells, from the plurality of 3D cells, that are associated with the boundary points;
deriving a centroid values for the boundary cells; and
performing the smoothing with respect to the boundary points, based on the centroid values of the boundary cells.

12. The method of claim 11, wherein identifying one of the boundary points comprises:
identifying a first pixel of the occupancy map frame that is valid and adjacent to a second pixel that is invalid; and
identifying a first point of the 3D point cloud, as a boundary point, when then first point is based on a pixel in one of the multiple frames that shares a location as the first pixel in the occupancy map frame,
wherein validity and invalidity of the first and second pixels included in the occupancy map frame is based on respective values of the pixels.

13. The method of claim 11, wherein identifying the boundary cells comprises:
identifying a first cell, of the plurality of 3D cells, that includes a boundary point of the boundary points;
identifying a region within the first cell that the boundary point is located;
identifying a predetermined number of neighboring cells that are adjacent to the first cell and closest to the region within the first cell that the boundary point is located; and identifying the first cell and the neighboring cells as the boundary cells that that are associated with the boundary point.

14. The method of claim 11, further comprises:

generating a first lookup table that lists the plurality of 3D cells and includes a predetermined entry value for the plurality of 3D cells; and after identifying the boundary cells, generating a second lookup table that includes the centroid values for the boundary cells.

15. The method of claim 14, further comprises modifying the predetermined entry value of the boundary cells that are included in the first lookup table to generate a correspondence between the boundary cells the first lookup table and the boundary cells of the second lookup table, respectively.

16. The method of claim 14, wherein:

a size of the first lookup table is based on a number of 3D cells of the grid, and a size of the second lookup table is based on a number of boundary cells that are associated with any of the identified boundary points.

* * * * *